US010983754B2

(12) United States Patent
Vantrease et al.

(10) Patent No.: US 10,983,754 B2
(45) Date of Patent: *Apr. 20, 2021

(54) ACCELERATED QUANTIZED MULTIPLY-AND-ADD OPERATIONS

(71) Applicant: Amazon Technologies, Inc., Seattle, WA (US)

(72) Inventors: Dana Michelle Vantrease, Austin, TX (US); Randy Huang, Morgan Hill, CA (US); Ron Diamant, Albany, CA (US); Thomas Elmer, Austin, TX (US); Sundeep Amirineni, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,010

(22) Filed: Jun. 2, 2020

(65) Prior Publication Data

US 2020/0293284 A1 Sep. 17, 2020

Related U.S. Application Data

(63) Continuation of application No. 15/934,681, filed on Mar. 23, 2018, now Pat. No. 10,678,508.

(51) Int. Cl.
*G06F 7/544* (2006.01)
*G06N 3/08* (2006.01)
(Continued)

(52) U.S. Cl.
CPC ............ *G06F 7/5443* (2013.01); *G06F 17/15* (2013.01); *G06N 3/063* (2013.01); *G06N 3/08* (2013.01); *G06N 3/0454* (2013.01)

(58) Field of Classification Search
None
See application file for complete search history.

(56) References Cited

U.S. PATENT DOCUMENTS 9,613,001 B2 * 4/2017 Herrero Abellanas ...................... G06N 3/063
2016/0342893 A1 11/2016 Ross et al.
(Continued)

FOREIGN PATENT DOCUMENTS

CN 107291419 10/2017
CN 107480770 12/2017

OTHER PUBLICATIONS

U.S. Appl. No. 15/934,681, "Non-Final Office Action", dated Aug. 15, 2019, 10 pages.
(Continued)

*Primary Examiner* — Michael D. Yaary
(74) *Attorney, Agent, or Firm* — Kilpatrick Townsend & Stockton LLP

(57) ABSTRACT

Disclosed herein are techniques for accelerating convolution operations or other matrix multiplications in applications such as neural network. In one example, an apparatus comprises a first circuit, a second circuit, and a third circuit. The first circuit is configured to: receive first values in a first format, the first values being generated from one or more asymmetric quantization operations of second values in a second format, and generate difference values based on subtracting a third value from each of the first values, the third value representing a zero value in the first format. The second circuit is configured to generate a sum of products in the first format using the difference values. The third circuit is configured to convert the sum of products from the first format to the second format based on scaling the sum of products with a scaling factor.

20 Claims, 11 Drawing Sheets

(51) Int. Cl.
  G06F 17/15    (2006.01)
  G06N 3/063    (2006.01)
  G06N 3/04     (2006.01)

(56) References Cited

U.S. PATENT DOCUMENTS

| | | | |
|---|---|---|---|
| 2017/0103305 | A1 | 4/2017 | Henry et al. |
| 2017/0103321 | A1 | 4/2017 | Henry et al. |
| 2017/0323197 | A1 | 11/2017 | Gibson et al. |
| 2018/0018559 | A1 | 1/2018 | Yakopcic et al. |
| 2018/0225116 | A1* | 8/2018 | Henry .................. G06F 9/3004 |
| 2018/0315157 | A1 | 11/2018 | Ould-ahmed-vall et al. |

OTHER PUBLICATIONS

U.S. Appl. No. 15/934,681, "Notice of Allowance", dated Feb. 11, 2020, 8 pages.
Chen et al., "Eyeriss: A Spatial Architecture for Energy-Efficient Dataflow for Convolutional Neural Networks", 2016 Acm/IEEE 43rd Annual International Symposium on Computer Architecture (ISCA), Jun. 1, 2016, pp. 367-379.
Jacob et al., "Quantization and Training of Neural Networks for Efficient Integer-Arithmetic-Only Inference", Arxiv.org, Cornell University Library, 201 Olin Library Cornell University ITHACA, Dec. 16, 2017, 10 pages.
Krishnamoorthi, "Quantizing Deep Convolutional Networks for Efficient Inference: A Whitepaper", Arxiv.org, Cornell University Library, 201 Olin Library Cornell University ITHACA, Jun. 21, 2018, 36 pages.
Meng et al., "Efficient Winograd Convolution via Integer Arithmetic", Arx1v.Org, Cornell University Library, 201 Olin Library Cornell University ITHACA, Jan. 7, 2019, 9 pages.
PCT/US2019/023133, "International Search Report and Written Opinion", dated Jun. 18, 2019, 15 pages.
Wei et al., "FPGA-Based Hybrid-Type Implementation of Quantized Neural Networks for Remote Sensing Applications", Sensors, vol. 19, No. 4, Feb. 22, 2019, 21 pages.
Application No. CN201980021173.2, Office Action, dated Feb. 4, 2021, 9 pages.

* cited by examiner

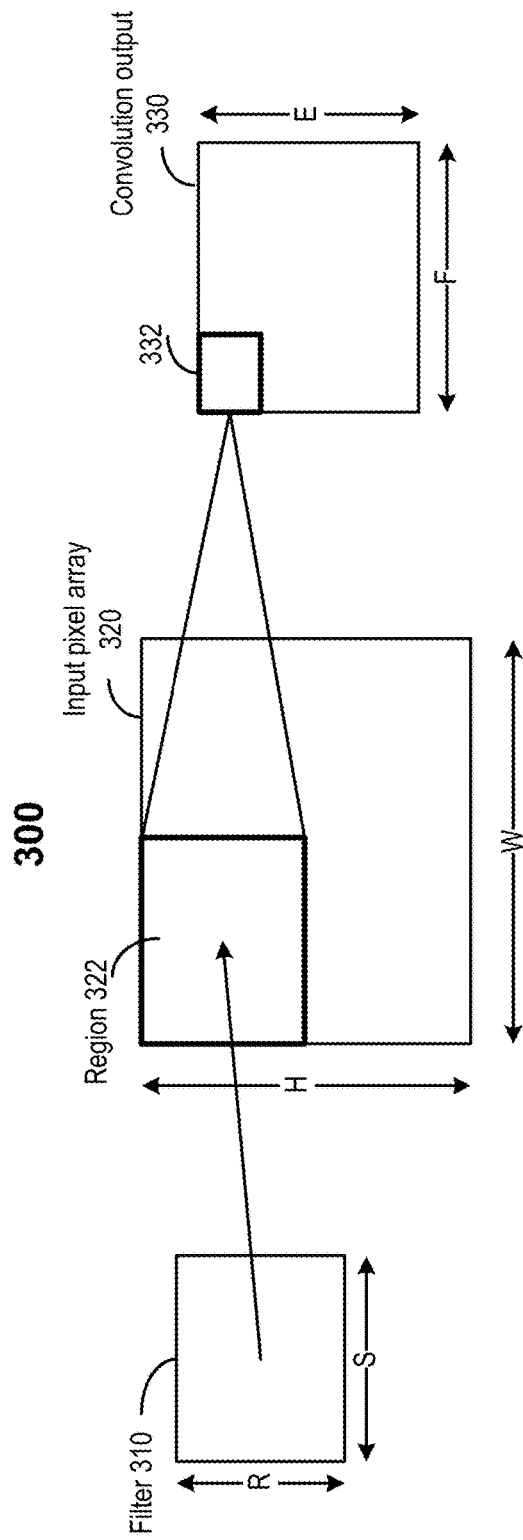
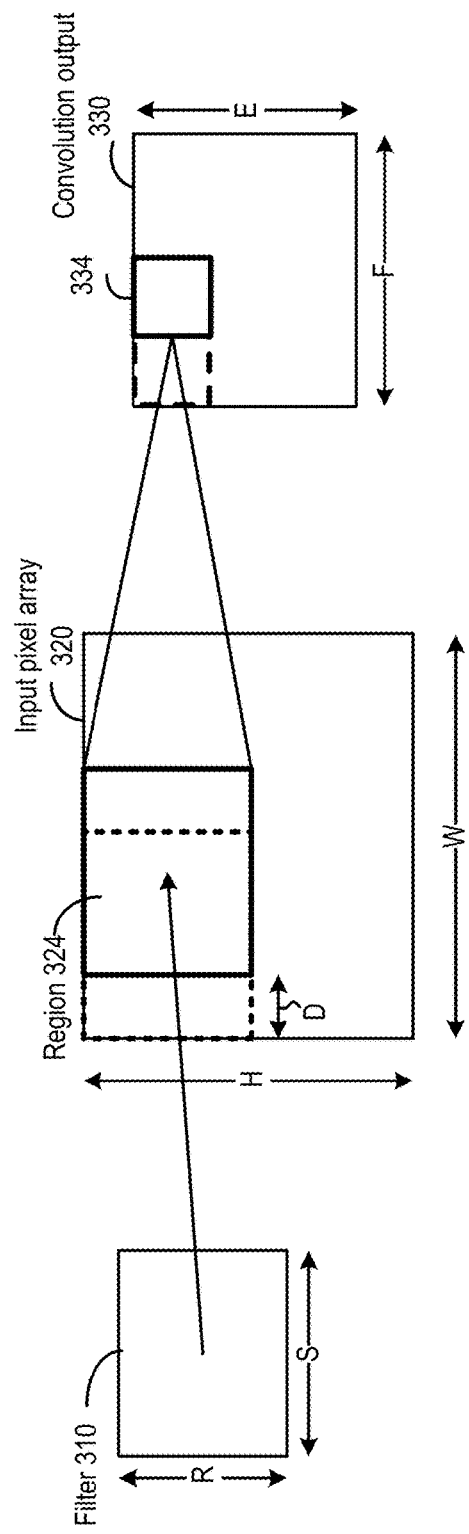
FIG. 3A
FIG. 3B

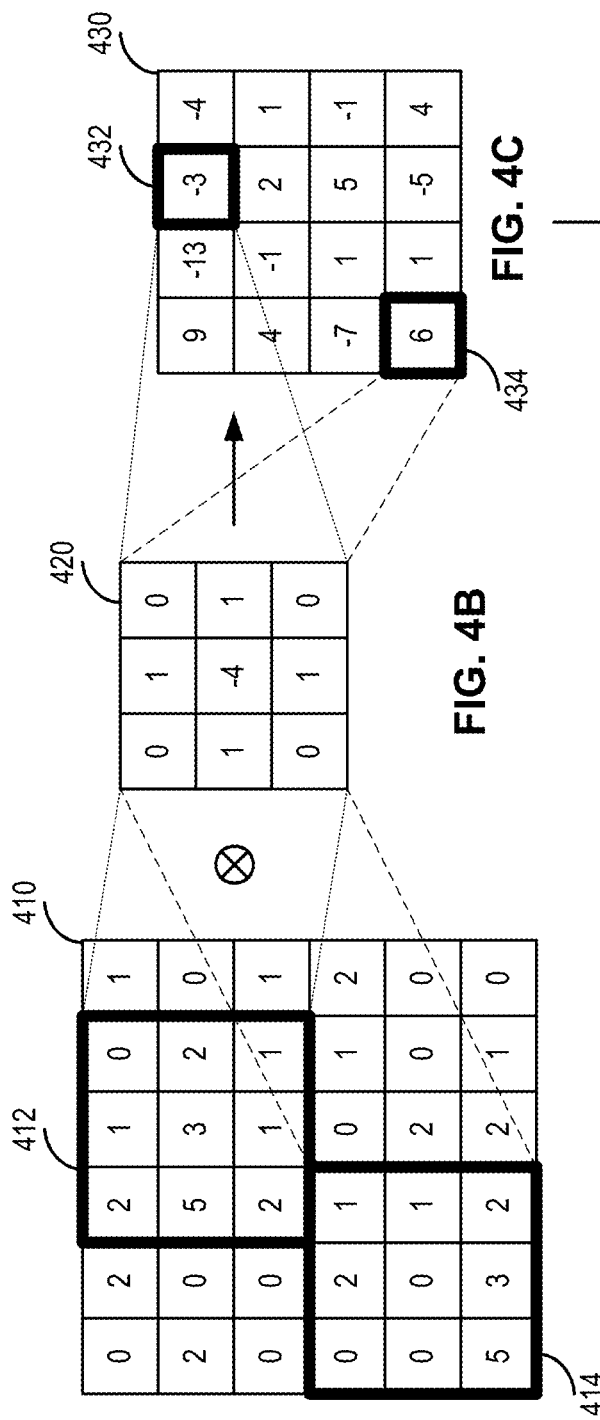

ACCELERATED QUANTIZED MULTIPLY-AND-ADD OPERATIONS

CROSS REFERENCE TO RELATED APPLICATIONS

This application claims priority to and is a Continuation of U.S. application Ser. No. 15/934,681, filed Mar. 23, 2018, issued as U.S. Pat. No. 10,678,508 on Jun. 9, 2020, and titled "ACCELERATED QUANTIZED MULTIPLY-AND-ADD OPERATIONS," the contents of which are incorporated in its entirety.

BACKGROUND

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, may include multiple layers of processing nodes. Each processing node on a layer can perform computations on input data generated by processing nodes on the preceding layer to generate output data. For example, a processing node may perform a set of arithmetic operations such as multiplications and additions to generate an intermediate output, or perform post-processing operations on the intermediate output to generate a final output. An artificial neural network, such as a deep neural network, may include thousands or more of processing nodes and millions or more of parameters.

In general, a neural network may be developed, trained, and made available to many end users. The end users can then use the trained neural network to perform various tasks (which may be referred to as the inference process) with or without changing the existing network. When a neural network is being built, the top priority may be to get a working and accurate network. Thus, floating point numbers and floating point arithmetic are generally used during training to preserve accuracy. The training process can be performed on a computing system that has sufficient memory space and computation power, and, in many cases, may not require real-time performance and may be performed in hours, days, or months. The inference process, however, may be performed using pre-trained networks on many computing devices with limited memory space and computation power, such as mobile devices or embedded devices. Thus, in many cases, accessing memory that stores the large floating point data and/or performing floating point computation (which may cause a high power consumption) may become a bottleneck for the inference processes.

BRIEF DESCRIPTION OF THE DRAWINGS

Various embodiments in accordance with the present disclosure will be described with reference to the drawings, in which:

FIGS. 3A and 3B illustrate convolution operations performed on an input pixel array by a convolution layer in a convolutional neural network;

FIGS. 4A-4E illustrate example convolution, non-linear activation, and pooling operations performed on example input pixels;

DETAILED DESCRIPTION

Figure 1:
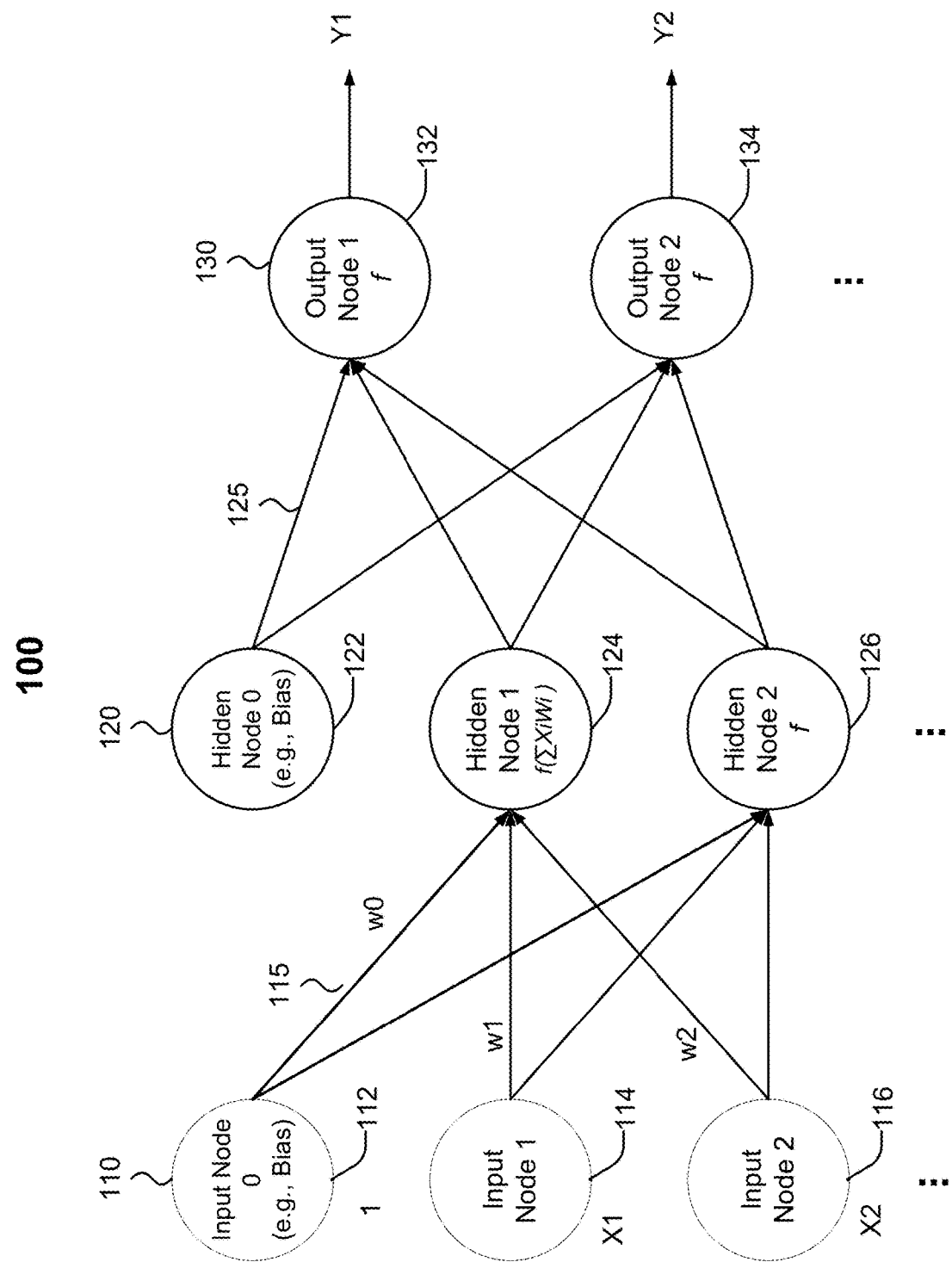
FIG. 1 illustrates an example multi-layer artificial neural network.

Techniques disclosed herein relate generally to artificial neural networks, and more specifically, to accelerating the quantized computation of the artificial neural network.

An artificial neural network (also referred to as a "neural network") may include multiple processing nodes arranged on two or more layers, where processing nodes on one layer may connect to processing nodes on another layer. The processing nodes can be divided into layers including, for example, an input layer, a number of intermediate layers (also known as hidden layers), and an output layer. Each processing node on a layer (e.g., an input layer, an intermediate layer, etc.) may receive a sequential stream of input data elements, multiply each input data element with a weight, compute a weighted sum of the input data elements, and forward the weighted sum to the next layer. An artificial neural network, such as a convolutional neural network, may include thousands or more of processing nodes and millions or more of weights and input data elements. The input data elements and the weights may generally be represented by floating point numbers (e.g., 32-bit floating point numbers) for accuracy reasons. Thus, the size of the data used for the computation may be very large. As such, a large memory space, a high-bandwidth bus, and a processing unit with a high parallel floating point processing performance may be required, which may limit the application of neural networks on devices with limited memory space, data transfer bandwidth, and/or computing power. In some implementations, to reduce the size of the data used for the computation and improve the efficiency of the computation during inference, quantized inputs and weight data in integer numbers (e.g., 8-bit integers) may be used for the computation (e.g., matrix multiplication), and the computation results may then be de-quantized to floating point numbers for further processing by a subsequent layer. However, the computation and the quantization-de-quantization process may still be very complex in many cases.

According to some embodiments, floating point data used for the computation during the inference using a neural network may be asymmetrically quantized (e.g., to 8-bit numbers) and pre-processed (e.g., shifted) before the matrix multiplication (e.g., convolution). As a result, a zero value in floating point data may not only be perfectly quantized (without quantization errors) to an integer number to avoid bias, but is also converted to a integer number "0" before the matrix multiplication, which may further simplify the matrix multiplication. The pre-processing may enable the storage and management of quantized data using byte-aligned memory with a smaller footprint. In addition, the pre-processing (e.g., shifting) can reduce the number of multiplications and summations to be performed for the matrix multiplication and simplify the de-quantization of the results of the matrix multiplication. For example, the matrix multiplication may be performed using one set of multiplications and summations, rather than four sets of multiplications and summations according to other techniques, and the de-quantization can be performed by scaling (i.e., multiplying) the results of the matrix multiplication with a floating point scaling factor. Therefore, the size of the data used for the computation can be reduced because shorter integer numbers (e.g., 8-bit integers) are used to represent the longer floating point values (e.g., 32-bit floating point values), and the matrix multiplication and the de-quantization can be significantly simplified. As such, a device with limited memory space and computation power may be able to handle the inference process, in some cases, in real time.

As used herein, a connection between two nodes may not necessarily mean that there is a physical connection between two nodes. In some embodiments, the connection may refer to a relationship between the value associated with one node and the value associated with another node. For example, a connection between two nodes may be represented by a coefficient (e.g., a weight) indicating how the value on one node is weighted in determining the value on the other node.

As used herein, a network node, a node, a processing node, a neural network node, or a neuron may not necessarily refer to a hardware unit or a physical device. In some embodiments, a network node, a node, a processing node, a neural network node, or a neuron may refer to a set of processing elements (PEs) configured to perform a set of arithmetic operations, such as a weighted sum of a set of input values. In some embodiments, a network node, a node, a processing node, a neural network node, or a neuron may refer to a set of arithmetic operations, such as a weighted sum of a set of input values.

As used herein, quantization may refer to transforming a number of a large data-type (e.g., 32-bit floating point number) into a number of a smaller data-type (e.g., 8-bit signed or unsigned integer), and de-quantization (or re-quantization) may refer to recovering a number of a large data-type from a number of a smaller data-type. Quantization and de-quantization may be linear transformations that are inverse to each other. In neural networks, quantized values may be used when large quantities of low-precision arithmetic are acceptable (e.g. convolution) and de-quantized values may be used when high-precision arithmetic is preferred (e.g. activation).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described. The figures and description are not intended to be restrictive. The word "example" is used herein to mean "serving as an example, instance, or illustration." Any embodiment or design described herein as "example" is not necessarily to be construed as preferred or advantageous over other embodiments or designs.

Artificial neural networks have been used in machine learning research and industrial applications and have achieved many breakthrough results in, for example, image recognition, speech recognition, computer vision, text processing, etc. The basic unit of computation in a neural network is the neuron (also referred to as a node). A neuron may receive input from some other neurons or an external source and compute an output. Each input may have an associated weight (w), which may be assigned based on the importance of the input relative to other inputs. The neuron may also apply a function (e.g., a nonlinear function) to the weighted sum of its inputs.

A feedforward neural network is a type of artificial neural network. It may include multiple nodes arranged in layers. Nodes from adjacent layers may have connections or edges between them. These connections may have corresponding weights associated with them. Information may flow from the input nodes, through the hidden nodes (if any) and to the output nodes. There are no circles or loops in the network. In contrast, recurrent Neural Networks (e.g., a long short-term memory (LSTM) network) may include connections between the nodes to form a circle or loop.

FIG. 1 illustrates an example multi-layer neural network 100. Multi-layer neural network 100 may include an input layer 110, a hidden (or intermediate) layer 120, and an output layer 130. In many implementations, multi-layer neural network 100 may include two or more hidden layers and may be referred to as a deep neural network. A neural network with a single hidden layer may generally be sufficient to model any continuous function. However, such a network may need an exponentially larger number of nodes when compared to a neural network with multiple hidden layers. It has been shown that a deeper neural network can be trained to perform much better than a comparatively shallow network.

Input layer 110 may include a plurality of input nodes (e.g., nodes 112, 114, and 116) that may provide information (i.e., input data) from the outside world to the network. The input nodes may pass on the information to the next layer, and no computation may be performed by the input nodes. Hidden layer 120 may include a plurality of nodes, such as nodes 122, 124, and 126. The nodes in the hidden layer may have no direct connection with the outside world (hence the name "hidden"). They may perform computations and transfer information from the input nodes to the next layers (e.g., another hidden layer or output layer 130). While a feedforward neural network may have a single input layer and a single output layer, it may have zero or multiple hidden layers. Output layer 130 may include a plurality of output nodes that are responsible for computing and transferring information from the network to the outside world, such as recognizing certain objects or activities, or determining a condition or an action.

As shown in FIG. 1, in a feedforward neural network, a node (except the bias node if any) may have connections to all nodes (except the bias node if any) in the immediately preceding layer and the immediate next layer. Thus, the layers may be referred to as fully-connected layers. All connections between nodes may have weights associated with them, even though only some of these weights are shown in FIG. 1. For a complex network, there may be hundreds or thousands of nodes and thousands or millions of connections between the nodes.

As described above, a feedforward neural network may include zero (referred to as a single layer perceptron), or one or more hidden layers (referred to as a multi-layer perceptron (MLP)). Even though FIG. 1 only shows a single hidden layer in the multi-layer perceptron, a multi-layer perceptron may include one or more hidden layers (in addition to one input layer and one output layer). A feedforward neural network with many hidden layers may be referred to as a deep neural network. While a single layer perceptron may only learn linear functions, a multi-layer perceptron can learn non-linear functions.

In the example shown in FIG. 1, node 112 may be a bias node having a value of 1 or may be a regular input node. Nodes 114 and 116 may take external inputs X1 and X2, which may be numerical values depending upon the input dataset. As discussed above, no computation is performed on input layer 110, and thus the outputs from nodes 112, 114, and 116 on input layer 110 are 1, X1, and X2, respectively, which are fed into hidden layer 120.

In the example shown in FIG. 1, node 122 may be a bias node having a value of 1 or may be a regular network node. The outputs of nodes 124 and 126 in hidden layer 120 may depend on the outputs from input layer 110 (i.e., 1, X1, X2, etc.) and weights associated with connections 115. For example, node 124 may take numerical inputs X1 and X2 and may have weights w1 and w2 associated with those inputs. Additionally, node 124 may have another input (referred to as a bias), such as 1, with a weight w0 associated with it. The main function of the bias is to provide every node with a trainable constant value (in addition to the normal inputs that the node receives). The bias value may allow one to shift the activation function to the left or right. It is noted that even though only three inputs to node 124 are shown in FIG. 1, in various implementations, a node may include tens, hundreds, thousands, or more inputs and associated weights.

The output Y from node 124 may be computed by:

$$Y=f(w1 \times X1+w2 \times X2+w0), \tag{1}$$

where function $f$ may be a non-linear function that is often referred to as an activation function. When a node has K inputs, the output from the node may be computed by:

$$Y=f(\Sigma_{i=0}^{K-1} w_i X_i) \tag{2}$$

Thus, the computation on each neural network layer may be described as a multiplication of an input matrix and a weight matrix and an activation function applied on the products of the matrix multiplication. The outputs from the nodes on an intermediate layer may then be fed to nodes on the next layer, such as output layer 130.

The purpose of the activation function is to introduce non-linearity into the output of a neural network node because most real world functions are non-linear and it is desirable that the neurons can learn these non-linear representations. The activation function may take a single number and perform a certain fixed mathematical operation on it. Several activation functions may be used in an artificial neural network. One example activation function is the sigmoid function $\sigma(x)$, which takes a real-valued input and transforms it into a value between 0 and 1:

$$\sigma(x)=1/(1+\exp(-x)). \tag{3}$$

Another example activation function is the tanh function, which takes a real-valued input and transforms it into a value within the range of [−1, 1]:

$$\tanh(x)=2\sigma(2x)-1 \tag{4}$$

A third example activation function is the rectified linear unit (ReLU) function. The ReLU function takes a real-valued input and thresholds it above zero (i.e., replacing negative values with zero):

$$f(x)=\max(0,x). \tag{5}$$

Another example activation function is the leaky ReLU function, which may be defined as:

$$\text{Leaky-ReLU}(x)=\max(0,x)+\alpha \min(0,x), \tag{6}$$

where $\alpha$ may be a pre-determined parameter or a parameter that can be learned.

Output layer 130 in the example shown in FIG. 1 may include nodes 132 and 134, which may take inputs from hidden layer 120 and perform similar computations as the hidden nodes using weights associated with connections 125. The calculation results (Y1 and Y2) are the outputs of the multi-layer perceptron. In some implementations, in an MLP for classification, a Softmax function may be used as the activation function in the output layer. The Softmax function takes a vector of real-valued scores and maps it to a vector of values between zero and one that sum to one.

For a given set of input features X=(x1, x2, . . . ) and a target Y, a multi-layer perceptron can learn the relationship between the features and the target for either classification or regression. A multi-layer perceptron may learn using a backpropagation algorithm. Backward propagation of errors (often referred to as BackProp) is one of several ways in which an artificial neural network can be trained. BackProp may be a supervised training scheme that learns from labeled training data and errors at the nodes by changing parameters of the neural network to reduce the errors.

As described above, the connections between nodes of adjacent layers in an artificial neural network have weights associated with them, where the weights may determine what the output vector is for a given input vector. The learning or training process may assign appropriate weights for these connections. In some implementations, the initial values of the weights may be randomly assigned. For every input in a training dataset, the output of the artificial neural network may be observed and compared with the expected output, and the error between the expected output and the observed output may be propagated back to the previous layer. The weights may be adjusted accordingly based on the error. This process is repeated until the output error is below a predetermined threshold.

The backward propagation of errors may be based on the chain-rule used for nested functions $y=f(g(x))$ to determine a gradient:

$$\frac{\partial y}{\partial x} = \frac{\partial f}{\partial x} = \frac{\partial f}{\partial g} \frac{\partial g}{\partial x}, \tag{7}$$

where $g(x)=\Sigma\Sigma_{i=0}^{n} x_i w_i$, $$\frac{\partial f}{\partial g}$$

is the derivative of the activation function, and $$\frac{\partial g}{\partial x}$$

may be proportional to weight w. The errors at the output nodes may be calculated and propagated back through the network to calculate the gradients. An optimization method, such as Gradient Descent, may be used to adjust the weights in the network to reduce the errors at the output layer. Backpropagation may be computationally cheaper than forward propagation as forward propagation may involve successively multiplying large matrices on each layer until multiplying a large matrix by a vector on the output layer. The backpropagation may start with multiplying a matrix by a first vector to get a second vector, multiplying another matrix by the second vector to get a third vector, and so forth. In other words, the backpropagation uses more efficient matrix-vector multiplications instead of matrix-matrix multiplications.

After the weight adjustment, the network should perform better than before for the same input because the weights have now been adjusted to minimize the errors. This process may be repeated for all training samples in the training dataset to learn from these samples.

In many situations, using the feedforward neural network as described above for real-world application, such as image classification, may not be practical. For example, for a two-dimensional (2-D) image with 200×200 pixels, 40,000 input nodes may be used in the neural network. If a hidden layer has 20,000 nodes, the size of the matrix for the weights would be 40,000×20,000 (or 800 million elements). If each weight is a 32-bit (i.e., 4-byte) floating point value, the total memory used for the weights would be 3.2 GB. This is just for the first layer. As the number of layers increases, the size of the weights may increase as well. In addition, vectorizing an image using individual pixels may ignore the complex 2-D spatial structure of the image.

One way to overcome these issues is to use convolutional neural networks that perform 2-D convolutions using smaller convolutional filters rather than the large matrix multiplications as described above. Learning a set of convolutional filters (e.g., 11×11 matrices) may be much easier and faster than learning a large matrix (e.g., 40,000×20,000). 2-D convolutions can also naturally take the 2-D structure of images into account. Convolutional neural networks may be described as feedforward neural networks with local connectivity and weight sharing. The local connectivity refers to the fact that a convolutional filter may have much smaller dimensions than the image it operates on. The weight sharing is due to the fact that a same filter may be used across the image when performing the convolution, which means that a same local filter is used on many locations in the image. In other words, the weights between all filtering for different locations in the image are shared.

Convolutional neural networks (also referred to as ConvNets or CNNs) are a type of neural networks that are very effective for applications such as image recognition and classification. For example, CNNs may be used to identify faces, objects, and traffic signs for use in robots and self-driving cars. CNNs may be used in natural language processing tasks (such as sentence classification) as well. LeNet developed by Yann LeCun et al. in 1990s for hand-written number recognition is one of the first convolutional neural networks that helped propel the field of deep learning. Several new architectures have been proposed in recent years to improve over the LeNet, but they all use the main concepts from the LeNet.

Figure 2:
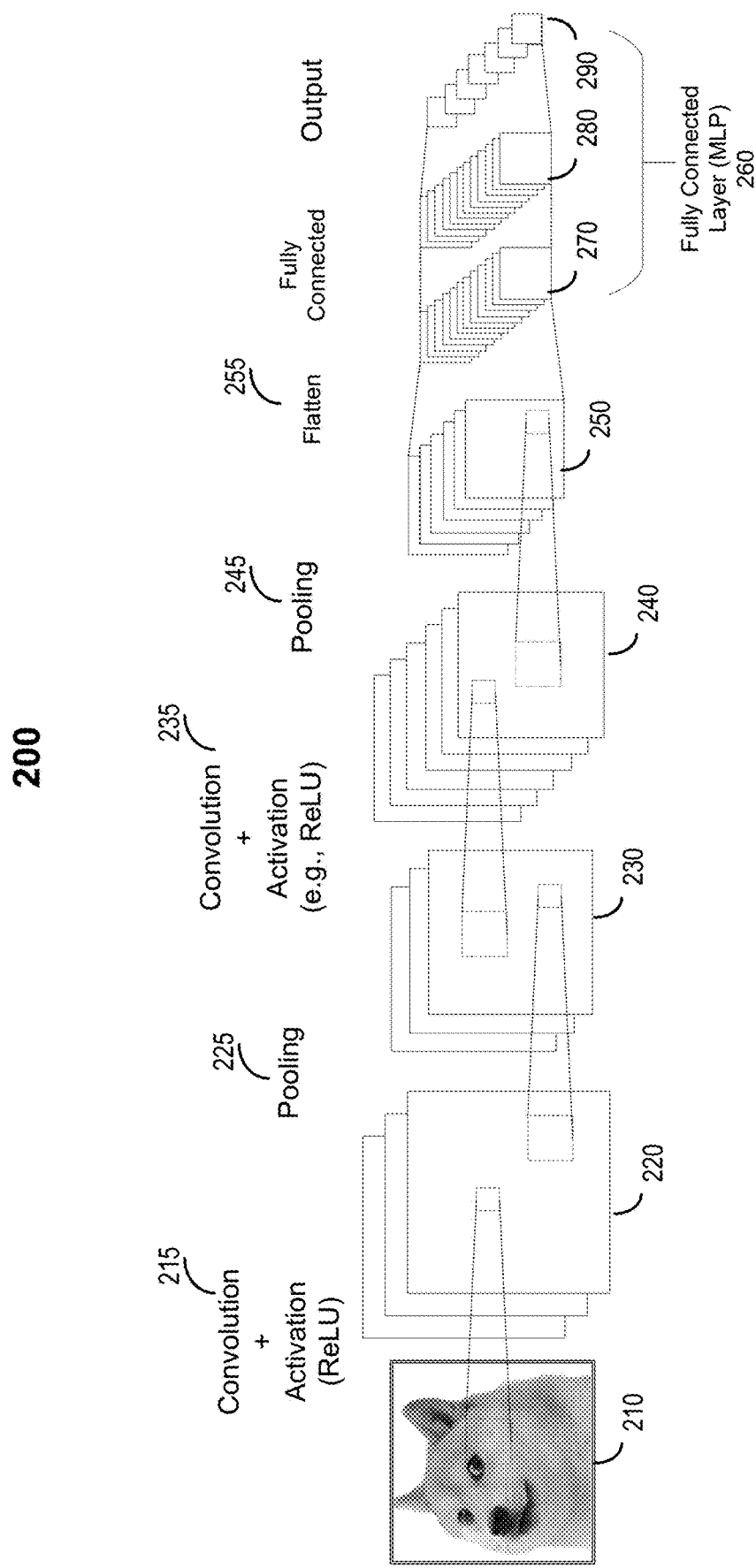
FIG. 2 illustrates an example convolutional neural network (CNN)

FIG. 2 illustrates an example convolutional neural network (CNN) 200 for image or object classification. CNN 200 may include four main operations: (1) convolution; (2) non-linearity function (e.g., ReLU); (3) pooling or subsampling; and (4) classification (fully-connected layer). These operations may be the basic building blocks of every convolutional neural network. Different CNNs may have different combinations of these four main operations.

An image to be classified, such as input image 210, may be represented by a matrix of pixel values. Input image 210 may include multiple channels, each channel representing a certain component of the image. For example, an image from a digital camera may have a red channel, a green channel, and a blue channel. Each channel may be represented by a 2-D matrix of pixels having pixel values in the range of 0 to 255 (i.e., 8-bit). A gray-scale image may have only one channel. In the following description, the processing of a single image channel using CNN 200 is described. Other channels may be processed similarly.

As shown in FIG. 2, input image 210 may be processed by a first convolution layer 215 using a first filter. More detail of the convolution is described below with respect to FIGS. 3A and 3B. First convolution layer 215 may also perform a non-linear activation function (e.g., ReLU) as described above. An output matrix 220 from first convolution layer 215 may have smaller dimensions than input image 210, and may be referred to as the convolved feature, activation map, or feature map. First convolution layer 215 may perform convolutions on input image 210 using multiple filters to generate multiple output matrices (or feature maps) 220. The number of filters used may be referred to as the depth of the convolution layer. In the example shown in FIG. 2, first convolution layer 215 may have a depth of three. Output matrix (or feature map) 220 may be passed to a pooling layer 225, where output matrix 220 may be sub-sampled or down-sampled to generate a matrix 230. More detail of the pooling operation is described below with respect to FIGS. 4D and 4E.

Matrix 230 may be processed by a second convolution layer 235 using a filter. A non-linear activation function (e.g., ReLU) may also be performed by the second convolution layer 235 as described above. An output matrix 240 (or feature map) from second convolution layer 235 may have smaller dimensions than matrix 230. Second convolution layer 235 may perform convolutions on matrix 230 using multiple filters to generate multiple output matrices (or feature maps) 240. In the example shown in FIG. 2, second convolution layer 235 may have a depth of six. Output matrix 240 may be passed to a pooling layer 245, where output matrix 240 may be subsampled or down-sampled to generate a matrix 250.

The two-dimensional output matrices 250 from pooling layer 245 may be flattened to a one-dimensional (1-D) vector by a flatten layer 255, and passed through a fully-connected layer 260 (i.e., a multi-layer perceptron (MLP)) as described in FIG. 1. Fully-connected layer 260 may include an input layer 270 (such as input layer 110 of FIG. 1) that takes the 1-D output vector from flatten layer 255. Fully-connected layer 260 may also include a hidden layer 280 (such as hidden layer 120 of FIG. 1) and an output layer 290 (such as output layer 130 of FIG. 1). Fully-connected layer 260 may classify the object in input image 210 into one of several categories using feature maps or matrix 250 and, for example, a Softmax function.

The operation of the fully-connected layer may be represented by matrix multiplications. For example, if there are M nodes on input layer 270 and N nodes on hidden layer 280, where the input $X=[x_1, x_2, x_3, \ldots, x_M]$, and the weights of the connections between the M nodes on input layer 270 and the N nodes on hidden layer 280 can be represented by:

$$W = \begin{bmatrix} w_{11} & w_{12} & w_{13} & \ldots & w_{1N} \\ w_{21} & w_{22} & w_{23} & \ldots & w_{2N} \\ w_{31} & w_{32} & w_{33} & \ldots & w_{3N} \\ \ldots & \ldots & \ldots & \ldots & \ldots \\ w_{M1} & w_{M2} & w_{M3} & \ldots & w_{MN} \end{bmatrix}. \quad (8)$$

The output Y of hidden layer 280 may be determined by:

$$Y = X \times W = [x_1, x_2, x_3, \ldots, x_M] \times \begin{bmatrix} w_{11} & w_{12} & w_{13} & \ldots & w_{1N} \\ w_{21} & w_{22} & w_{23} & \ldots & w_{2N} \\ w_{31} & w_{32} & w_{33} & \ldots & w_{3N} \\ \ldots & \ldots & \ldots & \ldots & \ldots \\ w_{M1} & w_{M2} & w_{M3} & \ldots & w_{MN} \end{bmatrix} = [y_1, y_2, y_3, \ldots, y_N]. \quad (9)$$

When a batch of K samples each including M inputs are received at the fully-connected layer, the inputs may be represented by a K×M matrix for the K samples. The outputs Y of hidden layer 280 may include K×N elements and may be determined by a 2-D matrix multiplication.

The convolution operations in a CNN may be used to extract features from input image 210. The convolution operations preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to get a final value that represents a single element of an output matrix (e.g., a feature map). Thus, a filter may act to detect features from the original input image.

FIGS. 3A and 3B illustrate the convolution operations performed on an input pixel array 320 using a filter 310 by a convolution layer in a convolutional neural network. Input pixel array 320 may include an input image, a channel of an input image, or a feature map generated by another convolution layer or pooling layer. FIG. 3A illustrates the convolution operation performed on a first region 322 of input pixel array 320 at a first step. FIG. 3B illustrates the convolution operation performed on a second region 324 of input pixel array 320 at a second step after sliding filter 310 by a stride.

Filter 310 may include a two-dimensional matrix, each element of the 2-D matrix representing a weight. The weights in filter 310 may be designed or trained to detect or extract certain features from the spatial distribution of pixel values in the image. The extracted features may or may not be meaningful to a human eye. Different filters may be used to detect or extract different features from the input pixel array. For example, some filters may be used to detect edges in an image, or to sharpen or blur an image. Filter 310 may have R rows (height) and S columns (width), and may typically be smaller than input pixel array 320, which may have a height of H pixels and a width of W pixels. Each weight in filter 310 may be mapped to a pixel in a region having R rows and S columns in input pixel array 320. For example, as shown in FIG. 3A, a convolution layer (e.g., first convolution layer 215 or second convolution layer 235) or a processing node of the convolution layer may receive pixel values for a region 322 (including R×S pixels) of input pixel array 320, perform element-wise multiplications between corresponding elements in filter 310 and region 322, and sum the products of the element-wise multiplications to generate a convolution output value 332. In other words, convolution output value 332 may be the sum of multiplication results between weights in filter 310 and corresponding pixels in region 322 according to $\Sigma_{i=0}^{n} x_i w_i$, that is, a dot-product between a matrix representing filter 310 and a matrix representing pixel values of region 322.

Similarly, as shown in FIG. 3B, the convolution layer (e.g., another processing node of the convolution layer) may receive pixel values for a region 324 (including R×S pixels) of input pixel array 320, perform element-wise multiplications between corresponding elements in filter 310 and region 324, and sum the products of the element-wise multiplications to generate a convolution output value 334. As shown in FIG. 3B, the convolution operations can be performed in a sliding-window fashion in a pre-determined stride D. For example, in the example shown in FIG. 3B, region 324 may be at a distance D (in terms of pixels) from region 322, and the next region for the next convolution operation may be situated at the same distance D from region 324. The stride D may be smaller or greater than the width S of filter 310.

The outputs of the convolution operations may form a convolution output matrix 330 with a height of E rows and a width of F columns. As described above, matrix 330 may be referred to as a feature map. The dimensions of matrix 330 may be smaller than input pixel array 320 and may be determined based on the dimensions of input pixel array 320, dimensions of filter 310, and the stride D. For example, if stride D is equal to one pixel in both horizontal and vertical directions, E may be equal to H−R+1, and F may be equal to W−S+1. In some implementations, each convolution output (e.g., output value 332 or 334) in FIGS. 3A and 3B may correspond to the output of a processing node of the convolution layer.

The convolution using one filter over an input pixel array may be used to produce one feature map, and the convolution using another filter over the same input pixel array may generate a different feature map. In practice, a CNN may learn the weights of the filters on its own during the training process based on some user specified parameters (which may be referred to as hyperparameters) before the training process, such as the number of filters, the filter size, the architecture of the network, etc. The more number of filters used, the more image features may get extracted, and the better the network may be at recognizing patterns in new images.

As described above, the sizes of the output feature maps may be determined based on parameters, such as the depth, stride, and zero-padding. As described above, the depth may correspond to the number of filters used for the convolution operation. In CNN 200 shown in FIG. 2, three distinct filters are used in first convolution layer 215 to perform convolution operations on the input image, thus producing three different output matrices (or feature maps) 220. Stride is the number of pixels by which the filter matrix is slid over the input pixel array. For example, when the stride is 1, the filter matrix is moved by one pixel at a time. When the stride is 2, the filter matrix is moved by 2 pixels at a time. Having a larger stride may produce smaller feature maps. In some implementations, the input matrix may be padded with zeros around the border so that the filter matrix may be applied to bordering elements of the input pixel array. Zero-padding may allow the control of the size of the feature maps.

As shown in FIG. 2, an additional non-linear operation using an activation function (e.g., ReLU) may be used after every convolution operation. As described above, ReLU is an element-wise operation that replaces all negative pixel values in the feature map by zero. The purpose of ReLU is to introduce non-linearity in the CNN. Other non-linear functions, such as tanh or sigmoid function, can also be used, but ReLU has been found to perform better in many situations.

Spatial pooling (also referred to as subsampling or down-sampling) may reduce the dimensions of each feature map, while retaining the most important information. In particular, pooling may make the feature dimensions smaller and more manageable, and reduce the number of parameters and computations in the network. Pooling may also make the network invariant to small transformations, distortions, and translations in the input image such that a small distortion in the input image may not change the output of pooling because the maximum or average value in a local neighborhood is used. Thus, pooling may help to achieve an equivariant representation of the input image such that objects in an image may be detected no matter where they are located. Spatial pooling may be performed in different ways, such as max pooling, average pooling, sum pooling, etc. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

FIGS. 4A-4E illustrate example convolution, non-linear activation, and pooling operations performed on example input pixel data. The input pixel data may represent, for example, a digital image, a channel of a digital image, or a feature map generated by a previous layer in a convolutional neural network. FIG. 4A illustrates an example input matrix 410 that includes the example input pixel data. Input matrix 410 may include a 6×6 pixel array, where each element of the pixel array may include a real number, such as an integer number or a floating point number. FIG. 4B illustrates an example filter 420. Filter 420 may include a 3×3 matrix, where each element of the matrix represents a weight of the filter. Filter 420 may be used to extract certain features from input matrix 410. For example, the example filter 420 shown in FIG. 4B may be a filter for detecting edges in an image.

Input matrix 410 and filter 420 may be convoluted to generate an output matrix 430 as shown in FIG. 4C. Each element in output matrix 430 may be the sum of element-wise multiplications (i.e., dot-product) between corresponding elements in filter 420 and an overlapping region 412 of input matrix 410 and may be determined in each step a window having the same dimensions as filter 420 (e.g., 3×3) slides over input matrix 410 with a certain stride (e.g., 1 element horizontally and/or vertically). For example, the value of element 432 in row 1 and column 3 of output matrix 430 may be the dot-product between the matrix representing filter 420 and a matrix representing region 412 of input matrix 410, where $2×0+1×1+0×0+5×1+3×(-4)+2×1+2×0+1×1+1×0=1+5-12+2+1=-3$. Similarly, the value of element 434 in row 4 and column 1 of output matrix 430 may be the dot-product between the matrix representing filter 420 and a matrix representing region 414 of input matrix 410, where $0×0+2×1+1×0+0×1+0×(-4)+1×1+5×0+3×1+2×0=2+1+3=6$. For input matrix 410 with a 6×6 pixel array and filter 420 represented by a 3×3 matrix, output matrix 430 may be a 4×4 matrix when the stride used is one element or pixel.

A non-linear activation function (e.g., ReLU, sigmoid, tanh, etc.) may then be applied to output matrix 430 to generate a matrix 440 as shown in FIG. 4D. In the example shown in FIG. 4D, the ReLU function is used, and thus all negative values in output matrix 430 are replaced by 0s in matrix 440. A pooling operation (e.g., a max, average, or sum pooling operation) may be applied to matrix 440 to sub-sample or down-sample data in matrix 440. In the example shown in FIGS. 4D and 4E, a max pooling operation may be applied to matrix 440, where the 4×4 matrix 440 may be divided into four 2×2 regions 442, 444, 446, and 448. The maximum value of each region may be selected as a subsample representing each region. For example, a maximum value of 9 is selected from region 442, a maximum value of 2 is selected from region 444, a maximum value of 5 is selected from region 446, and a maximum value of 6 is selected from region 448. Thus, a feature map 450 with four elements 9, 2, 6, and 5 may be generated from the 6×6 input matrix 410 after the convolution, non-linear activation, and pooling operations.

Referring back to FIG. 2, CNN 200 may include two sets of convolution, ReLU, and pooling layers, where the second convolution layer 235 may perform convolution operations on the output of pooling layer 225 using six filters to produce a total of six feature maps. ReLU may then be applied individually on all of these six feature maps. Next, max pooling operation may be performed on each of the six rectified feature maps. These convolution, ReLU, and pooling layers may, in combination, extract useful features from an image, introduce non-linearity in the network, and reduce feature dimension, while making the features equivariant to scale and translation. The output matrices 250 of pooling layer 245 represent high-level features of the input image, and may be used as an input to fully-connected layer 260.

Fully-connected layer 260 may be a multi-layer perceptron. As described above, in the fully-connected layer, every node in a layer is connected to every node on the adjacent layer(s). Fully-connected layer 260 may use the high-level features of the input image represented by output matrices 250 to classify the input image into various classes based on the training dataset. The fully-connected layer may also be used as a low-cost way to learn the non-linear combination functions of these high-level features. The features from the convolution and pooling layers may be good for the classification task, but non-linear combinations of those features might be even better.

Fully-connected layer 260 may use a Softmax activation function on the output layer. The Softmax function takes a vector of real-valued scores and transforms it to a vector with values (e.g., probabilities) between zero and one that sum to one. Thus, the sum of the output values from the fully-connected layer may be 1. In some embodiments, other classifiers, such as a support vector machine (SVM) classifier, can also be used.

In the example shown in FIG. 2, two sets of convolution and pooling layers are used. It is noted that these operations can be repeated any number of times in a single CNN. In addition, a pooling layer may not be used after every convolution layer. In some implementations, a CNN may perform multiple convolution and ReLU operations before performing a pooling operation.

The training process of a convolutional neural network, such as CNN 200, may be similar to the training process discussed above with respect to the feedforward neural network described in FIG. 2. First, all parameters and weights (including the weights in the filters and weights for the fully-connected layer) may be initialized with random values. Second, the convolutional neural network may take a training sample (e.g., a training image) as input, perform the forward propagation steps (including convolution, non-linear activation, and pooling operations, along with the forward propagation operations in the fully-connected layer), and determine the output probability for each possible class. Since the parameters of the convolutional neural network, such as the weights, are randomly assigned for the training example, the output probabilities may also be random.

The total error at the output layer (e.g., the sum over all possible classes) may be calculated by summing the probability errors for all possible classes. For example, the total error may be calculated based on:

$$\text{Total Error} = \tfrac{1}{2}\Sigma(\text{target probability} - \text{output probability})^2, \tag{10}$$

where the target probabilities may include a "1" corresponding to the actual class of the object in the image, and "0s" corresponding to other classes. Techniques such as the backpropagation techniques described above may then be used to calculate the gradients of the error with respect to parameters and weights to be trained in the network and use the gradient descent to update the parameters and weights to be trained in the network to minimize the output error. The weights may be fine-tuned or adjusted according to their contribution to the total error. When the same training sample is used as the input again, the output probabilities might be closer to the target probabilities, which indicates that the network has learned to classify this particular image. As described above, some parameters of the convolutional neural network, such as the number of filters, filter sizes, architecture of the network, etc., may have been pre-selected and remain unchanged during the training process. The above-described training process may be repeated for all training samples in the training dataset.

At the end of the training process, all weights and parameters of the CNN may have been optimized to correctly classify the training samples from the training dataset. When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

There may be many variations and improvements to CNN 200 described above, such as AlexNet (2012), ZFNet (short for Zeiler & Fergus Net) (2013), GoogLeNet (2014), VGG-Net (which shows that the performance of the network may depend on the depth (number of layers) of the network) (2014), Residual Network (ResNets) (2015), and Densely Connected Convolutional Network (DenseNet) (2016).

In the feedforward neural networks described above, all samples are considered to be independent. In a recurrent neural network (RNN), the same operations as described above may be perform on every element in a sequence, where the output for one input element may depend on the outputs for previous input elements. One of the most commonly used type of RNNs is the long short-term memory (LSTM) network, which may include an input layer, one or more LSTM layers, and a fully-connected layer.

The training process and inference process described above may be performed on hardware, software, or a combination of hardware and software. However, training an artificial neural network or using the trained artificial neural network for inference generally requires significant amount of computation power to perform, for example, the matrix multiplications or convolutions. Thus, specialized hardware circuits, such as graphic processing units (GPUs), tensor processing units (TPUs), neural network processing units (NPUs), FPGAs, ASICs, or other highly parallel processing circuits may be used for training and/or inference. Training and inference may be performed on a cloud, on a data center, or on a device.

Figure 5:
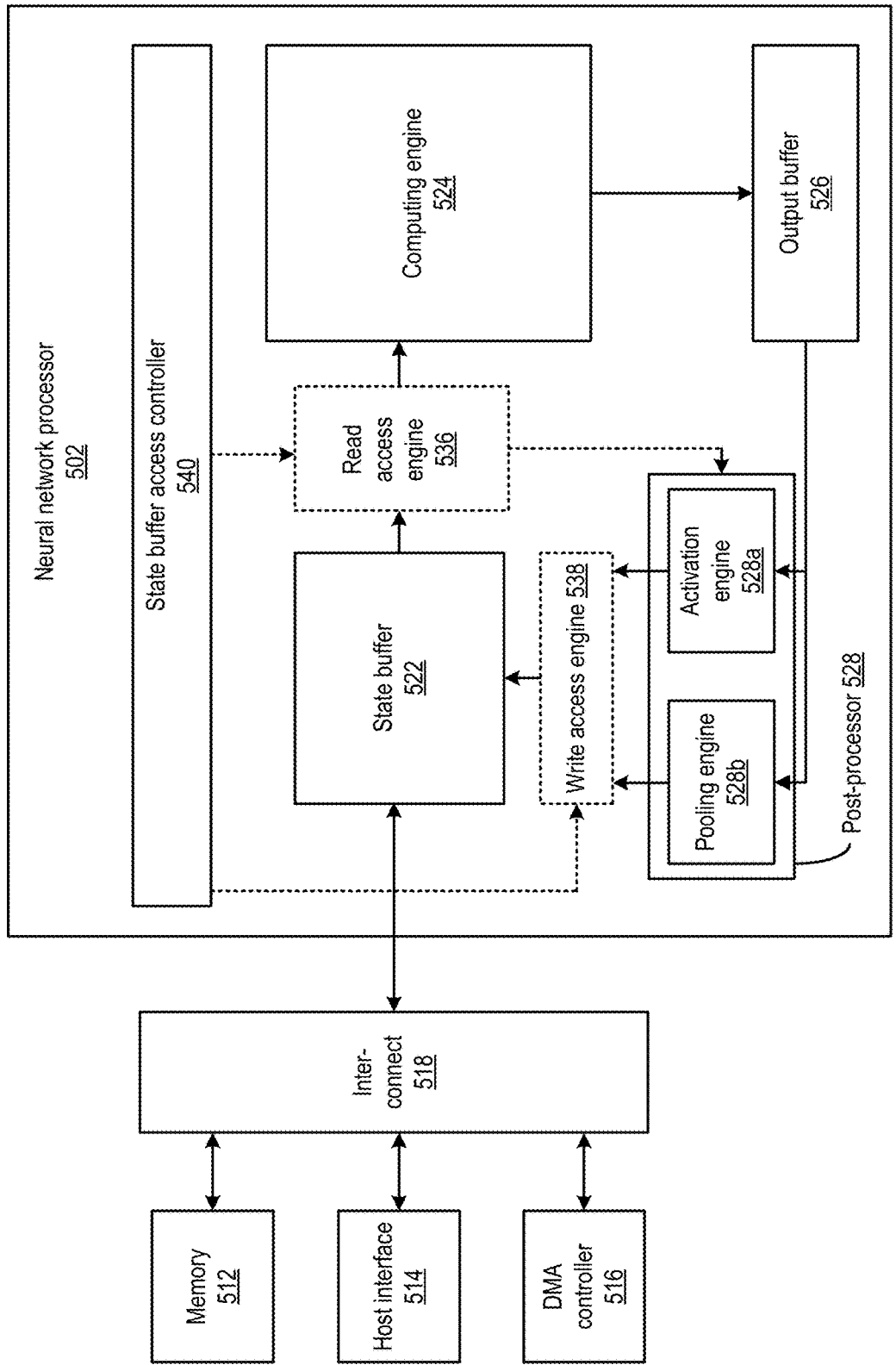
FIG. 5 illustrates an example apparatus for an example artificial neural network.

FIG. 5 illustrates an example apparatus 500 for an example artificial neural network. Apparatus 500 may be part of a computer system, such as a data center server. In some embodiments, apparatus 500 may be part of a multi-tenant compute service system (e.g., a cloud) and may communicate with a host device (not shown in FIG. 5) to provide computing and memory resources for a computing service. Apparatus 500 may include a neural network processor 502 coupled to memory 512, a direct memory access (DMA) controller 516, and a host interface 514 via an interconnect 518. Neural network processor 502 may provide computing resources to support inference using a trained neural network. More detail of the operation of neural network processor 502 is described below.

Memory 512 may be configured to store the instructions, input data (e.g., pixel data of images), and the weights (e.g., the filter data) or other parameters of the trained neural network received from, for example, the host device. Memory 512 may also be used to store the output of neural network processor 502 (e.g., one or more image recognition decisions on the input images) or some intermediary data. Memory 512 may include any suitable memory, such as dynamic random access memory (DRAM), synchronous DRAM (SDRAM), double data rate DRAM (DDR DRAM), storage class memory (SCM), flash memory devices, etc.

DMA controller 516 may be configured to perform DMA operations to transfer data between neural network processor 502 and the host device. For example, the host device may store the instructions, input data, the weights, and other parameters of the neural network at memory 512. The host device may provide the memory addresses for the stored instructions, data, weights, and other parameters of the neural network to neural network processor 502 (e.g., in the form of memory descriptors). Neural network processor 502 may then obtain the stored instructions, data, weights, or other parameters of the neural network based on the memory addresses provided by the host device. Neural network processor 502 may also store the results of computations (e.g., one or more image recognition decisions or intermediary data) at memory 512, and provide the memory addresses for the stored results to the host device.

Host interface 514 may enable communications between the host device and neural network processor 502. For example, host interface 514 may be configured to transmit the memory descriptors including the memory addresses of the stored data (e.g., input data, weights, results of computations, etc.) between the host device and neural network processor 502. Host interface 514 may include, for example, a peripheral component interconnect express (PCIe) interface or any suitable interface for communicating with the host device.

Neural network processor 502 may provide the computing resources to support the neural network computations for inference, such as image classification. In the example shown in FIG. 5, neural network processor 502 may include an integrated circuit, such as a system-on-chip (SoC), FPGA, or ASIC. Neural network processor 502 may include a number of circuit components, such as a state buffer 522, a computing engine 524, an output buffer 526, and a post-processor 528. In some implementations, neural network processor 502 may also include a read access engine 536 and a write access engine 538 to provide computing engine 542 and post-processor 528 with read and write access to state buffer 522 as discussed in detail below.

State buffer 522 may be configured to provide caching of data used for computations at computing engine 524. The data cached at state buffer 522 may include, for example, the input data and weights obtained from memory 512, output data from computing engine 524, and/or output data from post-processor 528. The caching may reduce the effect of memory access bottleneck (e.g., caused by the latencies at memory 512, DMA controller 516, interconnect 518, etc.) on the performance of computing engine 524. State buffer 522 may be an on-chip memory device and may include, for example, static random access memory (SRAM). In some embodiments, state buffer 522 may be partitioned based on the organization of computing engine 524. For example, state buffer 522 may include multiple SRAM banks, where each bank may be configured to store input data and weights for a row of computing engine 524.

Computing engine 524 may include an array of processing elements (PEs) configured to perform one or more arithmetic operations (e.g., vector multiplication) for neural network computations. In some implementations, computing engine 524 may be a matrix multiplication unit that may be used for matrix convolution and/or matrix multiplication, and thus may be used to implement a convolution layer or a fully-connected layer. For example, in some implementations, computing engine 524 may include a systolic array that includes a two-dimensional array of processing elements arranged in rows and columns.

Figure 6:
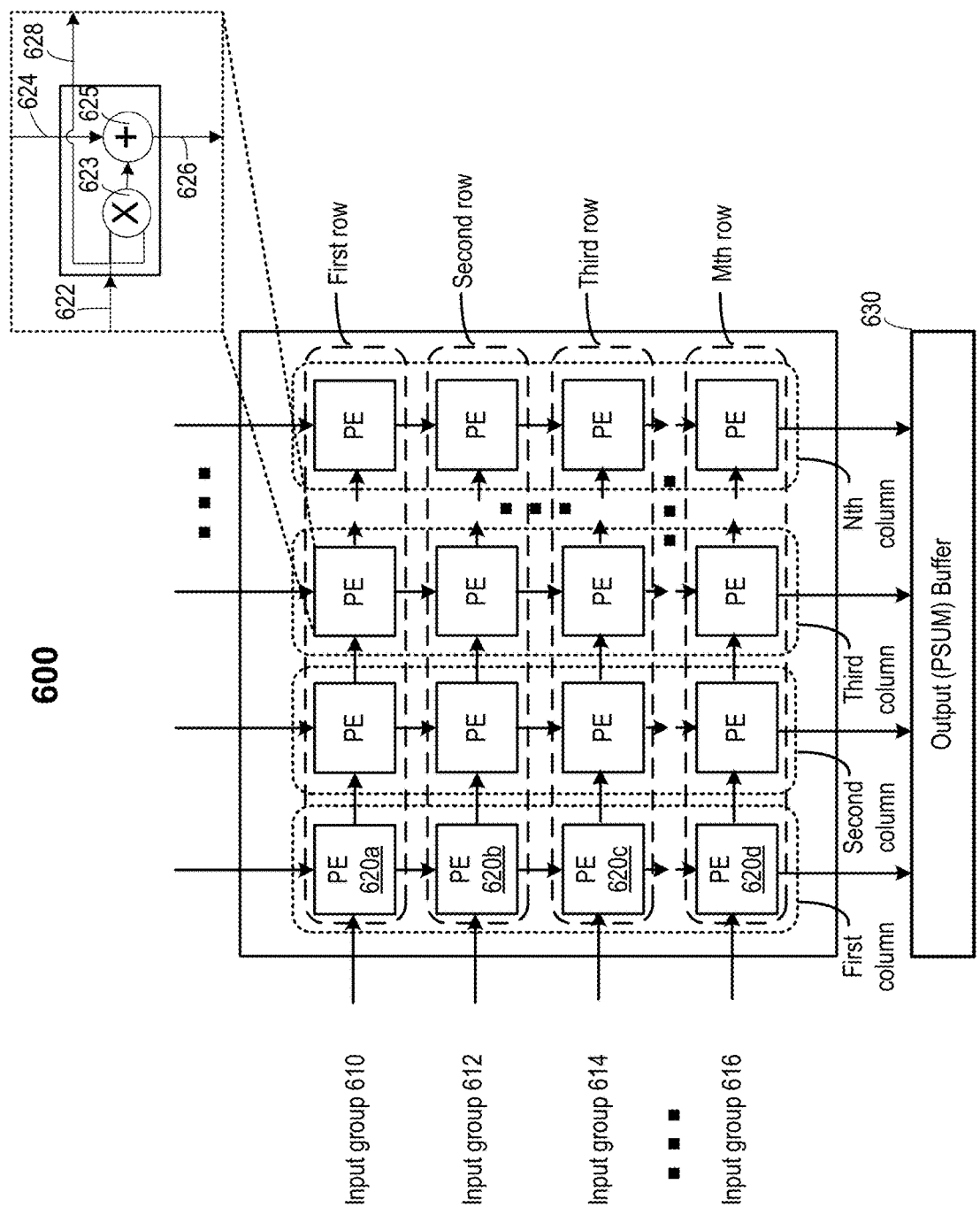
FIG. 6 illustrates a simplified example computing engine including an array of processing elements.

FIG. 6 illustrates a simplified example computing engine 600 including an array of processing elements 620. Computing engine 600 may be a simplified example of computing engine 524. In the example shown in FIG. 6, computing engine 600 may include an M×N array of PEs with N PEs in each of M rows and M PEs in each of N columns. Each PE may include a row input bus 622, a column input bus 624, a column output bus 626, and a row output bus 628. A PE may receive inputs from a preceding PE (on the left) in the same row (or from external circuitry) via row input bus 622. The PE may also receive inputs from a preceding PE (on top) in the same column (or from external circuitry) via column input bus 624. The inputs may be floating point values. The PE may perform floating point arithmetic operations (e.g., multiply and accumulate (MAC)) based on the inputs, and transmit the result of the arithmetic operations to a subsequent (lower) PE in the same column (or to external circuitry) via column output bus 626. The PE may also forward the inputs to a subsequent PE (to the right) in the same row, via row output bus 628.

Each row of computing engine 600 may process one input data set comprising multiple input data elements, whereas each column of computing engine 600 may generate a weighted sum of input data elements from different input data sets. For example, when computing engine 600 is to process M input pixel groups 610, 612, 614, . . . , and 616, a first row may receive input data elements of pixel group 610, a second row may receive input data elements of input pixel group 612, a third row may receive input data elements of input pixel group 614, . . . , and an Mth row may receive input data elements of input group 616. Each PE may include a multiplier 623 that would handle one input data element at a time. For example, the PE may receive an input data element and a weight (e.g., from row input bus 622) and generate, using multiplier 623, a multiplication product to represent a weighted input data element. The weight may be an element of a convolution kernel (i.e., filter) or a weight of a connection between nodes on two layers of a fully-connected layer. In addition, the PE may also receive a partial weighted sum from the preceding PE in the same column (e.g., from column input bus 624). The partial weighted sum represents the weighted sum of input data elements of input data sets received by PEs on rows above the PE. The PE may include an added 625 that may add the weighted input data element to the partial weighted sum, and pass the updated partial weighted sum to the PE below in the same column (e.g., through column output bus 626). The PE at the bottom row of each column may generate a weighted sum of input data elements received by all PEs in the column.

The operations of each PE of computing engine 600 may be synchronized to a clock signal to improve the interoperability between computing engine 600 and other components of the neural network processor (e.g., neural network processor 502). Each PE may also include sequential logic circuitries (e.g., registers, latches, flip-flops, state machines, etc.) to store input data, weights, and output data for the adder and multiplier circuitry, and to synchronize the flow of the data into and out of the circuitry. The sequential logic circuitry of each PE can be clocked by either the same clock signal or a replica of the clock signal, such that data may be synchronously shifted into and/or out of the PE sequentially during the clock cycles. For example, in a first clock cycle, a PE 620b of the second row may receive a first input data element of pixel group 612 as well as a partial sum comprising weighted first input data element of pixel group 610 from PE 620a of the first row. Within the first clock cycle, a PE 620b may multiply the input data element with a weight, add the multiplication product to the partial sum to generate an updated partial sum, and store the updated partial sum in an internal register. In the second clock cycle, PE 620b may forward the updated partial sum to a PE 620c on the third row below, which may perform the multiplication and accumulation to generate an updated partial sum. In the third clock cycle, PE 620c may forward the updated partial sum to a next PE on the fourth row below, which may perform the multiplication and accumulation to generate an updated partial sum. The updated partial sum may be propagated down along each column until it is output by PE 620d on the Mth row at the Mth clock cycle to an output buffer 630 (also referred to as a PSUM buffer).

In some implementations, each column of computing engine 600 may correspond to a processing node of a neural network layer, and may apply a different set of weights $\{w_i\}$ to generate a different weighted sum $y=\Sigma_{i=0}^n x_i w_i$ for each input dataset $\{x_i\}$.

Referring back to FIG. 5, post-processor 528 may be configured to perform post-processing on the outputs of computing engine 524 (which may act as a neural network layer, such as a convolution layer or fully-connected layer) that may be stored in output buffer 526 to generate final outputs for the neural network layer. In the example shown in FIG. 5, post-processor 528 may include an activation engine 528a and a pooling engine 528b. Activation engine 528a may perform one or more activation (non-linear) functions, such as tanh, sigmoid, ReLU, etc., on the outputs of a convolution layer to generate the output data, and store the output data at state buffer 522. In some implementations, activation engine 528a may include one or more multiplier circuits. Pooling engine 528b may perform, for example, maximum pooling, average pooling, etc., on the outputs of a convolution layer or activation engine 528a to generate subsamples, and store the subsamples at state buffer 522. In some implementations, pooling engine 528b may also include one or more multiplier circuits. Pooling engine 528b and/or activation engine 528a may also be controlled to be skipped for certain convolution layers. For example, as discussed above, a CNN may perform multiple convolution and ReLU operations before performing a pooling operation.

In some implementations, post-processor 528 may also include a Softmax engine (not shown in FIG. 5) that can perform a Softmax function on the output of the fully-connected layer. As described above, the Softmax engine may take a vector of real-valued scores from a fully-connected layer and map the vector of real-valued scores to a vector of probability values between zero and one that sum to one.

Read access engine 536 may provide read access to state buffer 522 for a read access requesting device including, for example, computing engine 524 and post-processor 528. Write access engine 538 may provide write access to state buffer 522 for a write access requesting device including, for example, post-processor 528. Each of read access engine 536 and write access engine 538 may convert a sequential series of access operations (e.g., multiple read or write operations across multiple clock cycles) to a single access operation to reduce power and reduce wait latency. Each of read access engine 536 and write access engine 538 may be organized based on state buffer 522. For example, each of read access engine 536 and write access engine 538 may include multiple sub-engines corresponding to multiple SRAM banks of state buffer 522, with each sub-engine providing access to a corresponding SRAM bank. A sub-engine of read access engine 536 may convert a sequential series of read access operations to a corresponding SRAM bank for multiple data elements (e.g., by a row of computing engine 524 or by post-processor 528) to a single read access for the multiple data elements. A sub-engine of write access engine 538 may also convert a sequential series of write accesses for storing multiple data elements at the corresponding SRAM bank (e.g., by post-processor 528) to a single write access for the multiple data elements.

Neural network, such as deep neural networks or convolutional neural network may include thousands or more of processing nodes and millions or more of parameters. These parameters may use a large memory space. For example, the original AlexNet may use a memory space of over 200 MB in 32-bit floating point (FP32) format. Almost all of the 200 MB is taken up by the weights for the connections between nodes. In general, the weights are arranged in large groups, where each group may include weights for one layer, and the weights within each group may be within a certain range, such as, for example, −3.0 to 6.0. Because these weights generally are slightly different floating point numbers, compression techniques, such as zip, Lemple-Ziv, or Huffman algorithm, may not compress them well.

As discussed above, neural network training is generally done by applying small adjustments to the weights, and such small adjustments typically need floating point precision to work. There have been some experiments attempting to perform training at lower precision, but the results seem to indicate that one needs more than eight bits to handle the back propagation and gradients of the training process. Taking a pre-trained model and running inference, on the other hand, may not need such high accuracy due to the unique characteristics of deep neural networks, which may be trained to handle noises in the inputs, such as, for example, CCD noises, lighting changes, or other lower level differences between the inputs and the training examples, and to focus on higher level similarities. Thus, the pre-trained neural network may treat the low-precision calculations as a type of noise, and produce accurate results even with less accurate numbers. Therefore, using quantized values for the inference may not affect the final results. In addition, there may be many known or pre-trained models with parameters in FP32 data format that can be used without having to perform the training process again. Thus, converting the parameters for these known or pre-trained network to less accurate integers, such as 8-bit unsigned integers (INT8), may enable faster and more cost-effective computation.

One way to reduce the data size of the parameters for a neural network is to quantize the parameters in floating point format to shorter integers, such as 8-bit (i.e., one-byte) integers. For example, quantizing FP32 numbers to 8-bit integers can reduce the data size to 25% of the original data size. It is generally desirable that the number of bits in each integer be a multiple of 8 (i.e., byte-aligned) for easy management and storage efficiency. In some implementations, the quantization and data size reduction may be achieved by symmetrical linear quantization of the floating point values. For example, if the parameters are within the range of −3.0 to 6.0, to quantize the parameters to, for example, 8-bit integers, floating point number −6.0 may be quantized to signed integer −128, floating point number 6.0 may be quantized to integer +127, and floating point number 0 may be quantized to integer 0. Constraining the minimum and maximum for the parameter range such that the minimum is always the negative of the maximum may be convenient for the implementation because it may avoid an offset to the operands of matrix multiplication. However, symmetrical quantization may cause unacceptable loss of accuracy for at least some neural networks. For example, in symmetrical quantization, if the range of the network parameters is not symmetrical, integers in a lower or upper range may never be used and the quantization resolution may be reduced.

In some implementations, the quantization and data size reduction may be achieved by storing the minimum and maximum values of the network parameters for each layer, and then asymmetrically quantizing each float point value to a closest integer (e.g., a 8-bit integer) in a linear set of integers within a range (e.g., 0-255 for 8-bit unsigned integers), where the lowest value in the range may correspond to the minimum value of the parameters for each layer and the highest value in the range may correspond to the maximum value of the parameters for each layer. For example, if the parameters are within the range of −3.0 to 6.0, a quantized integer 0 may represent floating point number −3.0, a quantized integer 255 would represent floating point number 6.0, and a quantized integer 128 may represent a floating point number around 1.5. In this way, the full range of the integers may be utilized and the quantization resolution may be improved over the symmetrical quantization.

The quantization of the network parameters can also reduce the computational resources for inference by performing the computation in, for example, 8-bit integers. For example, fetching 8-bit values may only use 25% of the memory bandwidth used for FP32 values, and thus the cache may be better utilized and the bottleneck on RAM access may be avoided. Single instruction multiple data (SIMD) operations may also be performed using 8-bit integers to perform many operations per clock cycle. Many processors, such as digital signal processors or vector processors, can be used to perform the inference using 8-bit integer parameters. Thus, using 8-bit parameters for the calculation may accelerate the inference, use less power, and enable the inference to be performed on systems with less storage and computation capacity (e.g., mobile devices or embedded systems) or systems not suitable for performing floating point arithmetic efficiently.

The quantized values may be used when large quantities of low-precision arithmetic are acceptable (e.g. convolution). However, for some operations, such as activation functions or pooling functions, high-precision arithmetic may be preferred. Thus, de-quantized values may need to be used for some operations. Therefore, in some implementations, data used for the convolution or matrix multiplication, such as weights and feature maps, may be encoded into quantized values, and the inputs to the activation/pooling layers may need to be converted back to de-quantized values.

Figure 7B:
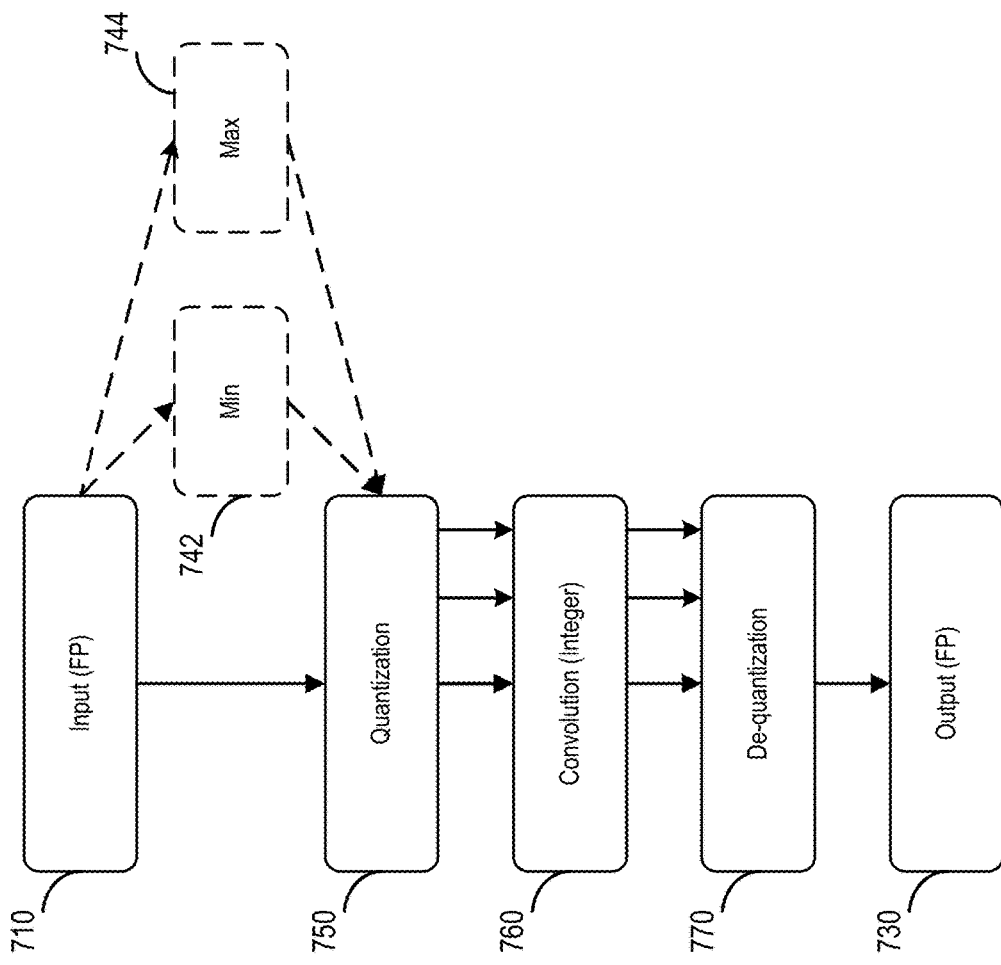
FIG. 7B illustrates an example convolution operation using integer numbers.
Figure 7A:
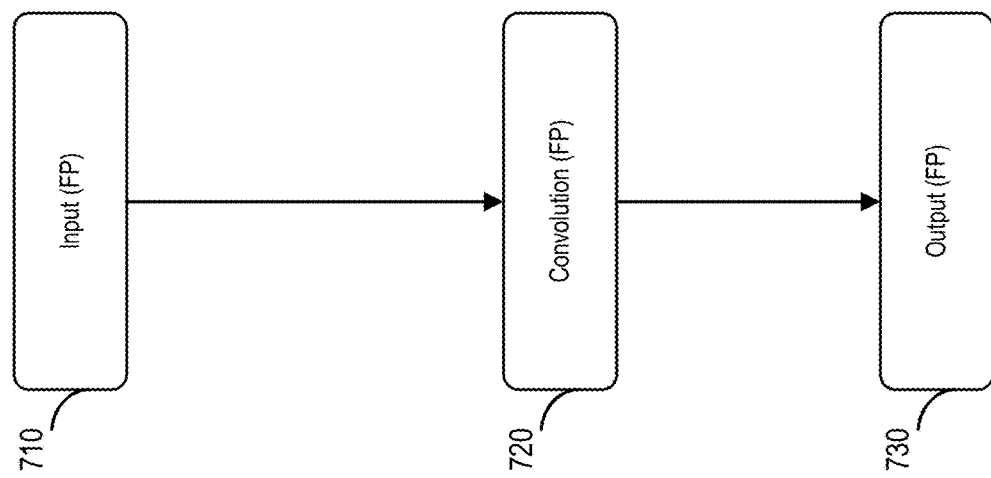
FIG. 7A illustrates an example convolution operation using floating point numbers.

FIG. 7A illustrates an example convolution operation 700 using floating point numbers. Convolution operation 700 may start at block 710 where inputs, such as weights and test samples that are represented by floating point values may be received at the input of the convolution layer. The floating point inputs may then be used for the convolution or other matrix multiplication, for example, using apparatus 500 of FIG. 5 or computing engine 600 of FIG. 6. The outputs of the convolution or other matrix multiplication, such as the partial weighted sums, may also be in floating point format, and may be sent to an output buffer (e.g., output buffer 526) for further processing by an activation engine and/or a pooling engine. As described above, the activation engine and/or the pooling engine may perform high-precision floating point arithmetic. As described above, such operations may require large memory space, high bus bandwidth, and high floating point computation power.

FIG. 7B illustrates an example convolution operation 740 using integer numbers. Convolution operation 740 may be performed more efficiently using less resources than convolution operation 700. As in convolution operation 700, inputs, such as weights and test samples, that are represented by floating point values may be received at the input of the convolution layer at block 710. In some embodiments, the minimum and maximum values may be pre-calculated. For example, the weights are generally known at load time and their ranges can be stored as constants together with the weights. In some cases, the inputs to the convolution layer (e.g., inputs for images are usually RGB values within the range of 0.0 to 255.0) and the outputs of many activation functions may have known ranges too, and thus it may not be necessary to analyze the inputs to a convolution layer to determine the range. In some embodiments, the minimum and maximum values of the inputs, for example, the inputs that are the outputs of the previous layer, may not be known and may be determined at blocks 742 and 744. For example, the sum of two 8-bit numbers may have 9 bits, the product of two 8-bit numbers may have 16 bits, the sum of a series of 8-bit multiplications in the matrix multiplication may have more than 16 bits, such as 20 to 32 bits.

At block 750, the floating point inputs may be quantized to signed or unsigned integers, such as 8-bit signed integers (INT8), 8-bit unsigned integers (UINT8), 16-bit signed integers (INT16), or 16-bit unsigned integers (UINT16). The quantization may be symmetrical or asymmetrical linear quantization as described above and in more detail below, based on the minimum and maximum values determined at, for example, blocks 742 and 744. At block 760, the convolution or other matrix multiplication may be performed using the quantized integers. As discussed above, the convolution or other matrix multiplication may be performed more efficiently using the quantized integers and may be performed using less resources. At block 770, the integer outputs of the convolution may be de-quantized based on the minimum and maximum values so that the floating point outputs at block 730 may be used by a subsequent layer (e.g., an activation layer) that may require floating point operations.

The quantization may be performed based on a transformation that converts real values to integer values (and vice versa for de-quantization). Example transformations that can be used for the quantization include:

$$X = S_X \cdot X_q + \text{Bias}, \quad (11)$$

and $$X = S_X \cdot (X_q - \text{Bias}), \quad (12)$$

where $X_q$ is the quantized integer value, X is the FP32 real value, $S_X$ is a positive FP32 number used for scaling (i.e., the scaling factor). In many situations, it may be desirable that the FP32 real value 0 can be exactly represented by a quantized integer value for optimized implementations. For instance, as described above, in a convolution or pooling layer, it may be useful to implement zero-padding. In many cases, the matrix (e.g., a feature map) may be a sparse matrix that may include many real value 0s. In order for the quantized implementation of such layers to be feasible, it may be desirable that the real value 0 be exactly representable (i.e., with no quantization error for the real value 0) by a quantized number referred to as a zero-point integer. In addition, a common optimization in CNNs is to skip certain padding computations that are known to be zero. This may only be possible if zero is exactly representable. If real value 0 is not exactly representable by a quantized integer, i.e., the zero-point integer does not correspond to the real value 0 exactly, inaccuracy may be introduced in the result because the real value 0 is usually not randomly distributed and thus the quantization errors may not have a zero average value, and may introduce bias in the result.

In equation (11), for X to be 0, the zero-point integer would be $X_{qz} = -\text{Bias}/S_X$. Thus, $-\text{Bias}/S_X$ needs to be an integer for $X_{qz}$ to be an integer, which may not be easily satisfied. In some implementations, the bias may be dropped, which may result in symmetrical quantization. As described above, symmetrical quantization may cause unacceptable loss of accuracy for at least some neural networks.

In equation (12), for X=0, $S_X$ can be any value and Bias can be the zero-point integer $X_{qz}$. Thus, with equation (12), the condition that real value 0 be exactly representable can be easily satisfied, where the zero-point integer is an integer value by definition. Therefore, equation (12) can be rewritten as:

$$X = S_X \cdot (X_q - X_{qz}) \text{ or } X_q = X_{qz} + \left\lfloor \frac{1}{S_X} X \right\rfloor. \quad (13)$$

For example, if the range of X is [−0.5,3.5), $S_X$ may be equal to 1/64, and $X_{qz}$ may be equal to 32, which may lead to: $X_q=32+(64\cdot(-0.5))=0$ for X=−0.5, $X_q=32+64\cdot0=32=X_{qz}$ for X=0, and $X_q=32+64\cdot3.499=255$ for X=3.499. It is noted that the transformation defined by equation (12) or (13) is asymmetric because it does not assume that the range of the floating point inputs is symmetric with respect to real value 0 (i.e., bound by −max and max). It is also noted that 8-bit unsigned integers (UINT8) (instead of signed integers) can be used to represent the FP32 inputs using the transformation defined by equation (12) or (13).

The product matrix resulted from the multiplication of weight matrix W and input data (e.g., feature map) matrix X may be determined by:

$$\begin{bmatrix} P^{(00)} & P^{(01)} \\ P^{(10)} & P^{(11)} \end{bmatrix} = \begin{bmatrix} X^{(00)} & X^{(01)} \\ X^{(10)} & X^{(11)} \end{bmatrix} = \begin{bmatrix} W^{(00)} & W^{(01)} \\ W^{(10)} & W^{(11)} \end{bmatrix}. \quad (14)$$

It is noted that even though matrix X and matrix W shown in equation (14) are 2×2 matrices, the sizes of matrix X and matrix W may vary. For example, matrix X may be any M×N matrix, and matrix W may be any N×K matrix. With the transformation from floating point real values X to quantized integer values $X_q$ as described above, the multiplication of matrices in real value floating point numbers may be calculated by the multiplication of matrices of quantized input values using a quantized weight matrix, a quantized feature map matrix, two zero-point integers $X_{qz}$ (for the feature map) and $W_{qz}$ (for the weight matrix), and 2 floating point scaling factors $S_X$ (for the feature map) and $S_W$ (for the weight matrix).

For example, in some implementations, the matrix multiplication described in equation (14) may be performed using the expanded form:

$$P^{(ij)} = \sum_k X^{(ik)} W^{(kj)} = S_X S_W \cdot \sum_k (X_q^{(ik)} - X_{qz})(W_q^{(kj)} - W_{qz}) \quad (15)$$

$$= S_X S_W \cdot \sum_k X_q^{(ik)} W_q^{(kj)} - S_X S_W \cdot \sum_k X_q^{(ik)} W_{qz}$$

$$- S_X S_W \cdot \sum_k X_{qz} W_q^{(kj)} + S_X S_W \cdot \sum_k X_{qz} W_{qz}.$$

As shown by equation (15), even though the quantization process can reduce the data size for the weights and the feature map and achieve more efficient computations because UINT8 computations are much faster than FP32 computations, the implementation shown by equation (15) includes four sums of products through quadratic expansion, which may be complex and thus expensive to compute. For example, to perform the four sums of products using a PE array as shown in FIG. 6, the data may need to pass through the PE array four times, where one sum of products may be calculated in each pass. Thus, the implementation shown by equation (15) may not be as efficient as desired.

According to certain embodiments, the multiplication of weight matrix W and input data (e.g., feature map) matrix X may be performed much more efficiently without the quadratic expansion and in the form of:

$$P^{(ij)} = \sum_k X^{(ik)} W^{(kj)} = \sum_k S_X \cdot (X_q^{(ik)} - X_{qz}) \cdot S_W \cdot \quad (16)$$

$$(W_q^{(kj)} - W_{qz})$$

$$= S_X S_W \cdot \sum_k (X_q^{(ik)} - X_{qz})(W_q^{(kj)} - W_{qz}).$$

Thus, the matrix multiplication according to equation (16) may be performed in three steps. In the first step, the quantized inputs (e.g., the weights and the feature map) may be shifted by subtracting the zero-point integer $X_{qz}$ or $W_{qz}$ from the quantized inputs to generate difference values:

$$X_{adj} = (X_q^{(ik)} - X_{qz}), \quad (17)$$

and $$Y_{adj} = (W_q^{(kj)} - W_{qz}), \quad (18)$$

where $X_{adj}$ and $Y_{adj}$ may be 9-bit signed integers if the inputs are quantized to 8-bit unsigned integers. In this way, real value 0 that is quantized to integer value $X_{qz}$ or $W_{qz}$ may become integer value 0 in the 9-bit signed integer format because $X_{qz} - X_{qz} = 0$ and $W_{qz} - W_{qz} = 0$. This may further simplify the subsequent multiplication because, as described above, the feature map may be a sparse matrix that includes many real value 0s or may include many padded 0s, and any multiplication with 0 will yield 0.

In the second step, the shifted quantized inputs $X_{adj}$ and $Y_{adj}$ generated in the first step may be multiplied and accumulated according to:

$$Z = \sum_k X_{adj} * Y_{adj}. \quad (19)$$

As described above, if $X_q$ and $W_q$ are 8-bit unsigned integers, $X_{adj}$ and $Y_{adj}$ may be 9-bit signed integers. Thus, the multiplication may be performed on 9-bit signed integers, and the product of each multiplication may be represented by, for example, an 18-bit integer. The sum Z of the products may be represented by, for example, a 32-bit integer.

In the third step, the sum Z of the products from the second step may be scaled by a floating point scaling factor $S_X S_W$ to convert the integer sum of products into a floating point number:

$$P^{(ij)} = S_X S_W \cdot Z. \quad (20)$$

Thus, compared with the implementation using equation (15), only one sum of products, rather than four sums of products, may be calculated for the matrix multiplication, and thus may be performed by a PE array in a single pass.

As described above, the shifted quantized inputs $X_{adj}$ and $Y_{adj}$ may be represented by 9-bit signed integer (INT9) and thus the multiplication may be done using INT9 operands, where 9 is not a power of 2. Storage and management of data-types with a number of bits that is not a power of 2 in memory may not be very efficient. Storing the INT9 data in 16-bit format may waste memory space. According to certain embodiments, the quantized inputs $X_q$ and $W_q$ may be saved in and retrieved from the memory in the UINT8 format. A pre-processing module that includes subtraction engines may be used to shift the quantized inputs $X_q$ and $W_q$ by subtracting the zero-point integer $X_{qz}$ or $W_{qz}$ from the quantized inputs according to equations (17) and (18) before the matrix multiplication. The results of the matrix multiplication using the shifted quantized inputs $X_{adj}$ and $Y_{adj}$ may be scaled by a floating point scaling factor $S_X S_W$ to convert the results of the matrix multiplication to the more precise real value in floating point format as inputs to a subsequent layer.

Figure 8:
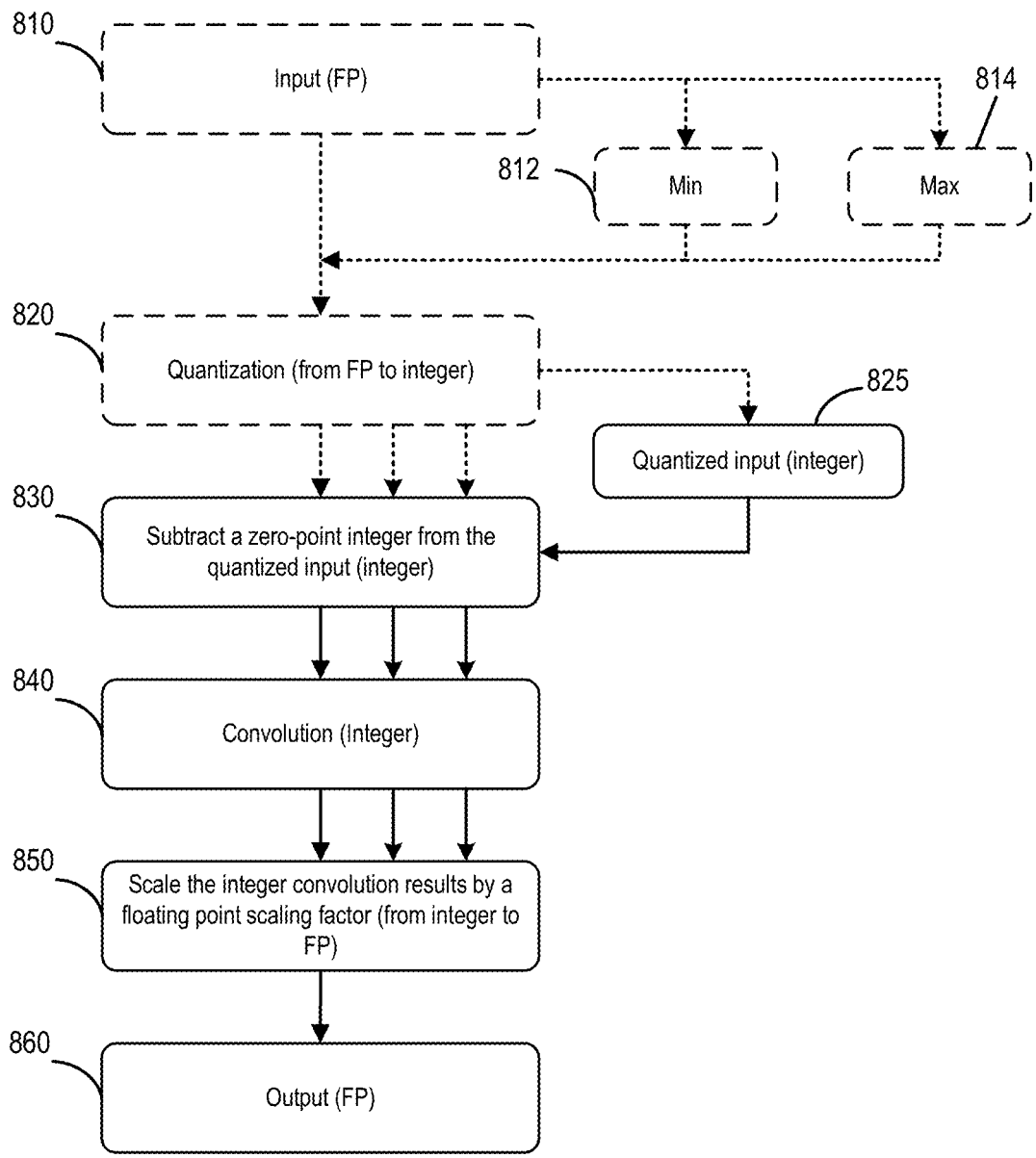
FIG. 8 illustrates an example convolution operation using integer numbers according to certain embodiments.

FIG. 8 illustrates an example convolution operation 800 using integer numbers according to certain embodiments. As in the convolution of FIG. 7B, inputs to a convolution layer, such as weights and test samples or intermediate feature maps, that are represented by floating point values may be received at block 810. In some embodiments, the minimum and maximum values of the inputs, such as inputs that are the outputs of the previous layer, may not be known in advance and may be determined at block 812 and 814. In some embodiments, the minimum and maximum values may be pre-calculated. For example, the weights for the neural network are generally known at the load time and their ranges can be stored as constants together with the weights. In some cases, the input data (e.g., images represented by RGB values in the range of 0.0 to 255.0) and the outputs of many activation functions may have known ranges too, and thus it may not be necessary to analyze the inputs to determine the range.

At block 820, the floating point inputs may be quantized to signed or unsigned integers, such as 8-bit unsigned integers (UINT8), 8-bit signed integers (INT8), 16-bit signed integers (INT16), or 16-bit unsigned integers (UINT16). The quantization may be asymmetrical linear quantization as described above with respect to equation (12) or (13) based on the minimum and maximum values determined at, for example, blocks 812 and 814. The quantized inputs may be stored in memory 825, which may be an on-chip state buffer or an off-chip memory. In some embodiments, memory 825 may also store the scaling factors (e.g., $S_X$ and $S_W$) and the zero-point integers (e.g., $X_{qz}$ and $W_{qz}$).

At block 830, the quantized inputs may be read from memory 825 and pre-processed by subtracting the zero-point integer from the quantized inputs to generate difference values as described above with respect to equations (17) and (18). As also described above, subtracting the zero-point integer from the quantized inputs may shift the quantized inputs and convert the quantized inputs into difference values in, for example, 9-bit signed integers. After the pre-processing, real value 0 that is quantized to an integer value (i.e., the zero-point integer) may become integer value 0 in the 9-bit signed integer format, which may simplify the subsequent multiplication because the input data (e.g., a feature map) may be a sparse matrix that includes many real value 0s or may include many padded 0s, and any multiplication with 0 will yield 0.

At block 840, the convolution or other matrix multiplication may be performed using the shifted quantized integers (e.g., the difference values) as described above with respect to equation (19). As also discussed above, the convolution or other matrix multiplication may be performed more efficiently using the quantized integers and may be performed using less resources. It is noted that the convolution may be performed using, for example, 9-bit signed integers, rather than 8-bit unsigned integers, and thus the multiply and accumulate (MAC) hardware (e.g., the processing elements) used in some implementations may be slightly different from the MAC hardware used for 8-bit unsigned integers.

At block 850, the integer outputs of the convolution or other matrix multiplication (i.e., the sums of products) may be scaled by a scaling factor (e.g., $S_X S_W$) to convert to more precise real values in floating point format as described above with respect to equation (20). The floating point outputs at block 860 may be used as input to a subsequent layer (e.g., an activation layer) that may require floating point operations.

In various implementations, the above described convolution operation or matrix multiplication may be performed in hardware, software, or a combination of software and hardware. For example, in some implementations, the above described convolution operation or matrix multiplication may be implemented in software that may be executed by, for example, a parallel processing unit, a vector processor, a digital signal processor, a graphic processing unit, a tensor processing unit, a network processing unit, an FPGA, an ASIC, etc. In some implementations, the above described convolution operation or matrix multiplication may be implemented using an apparatus similar to apparatus 500 or a computing engine similar to computing engine 600 with some modifications.

Figure 9:
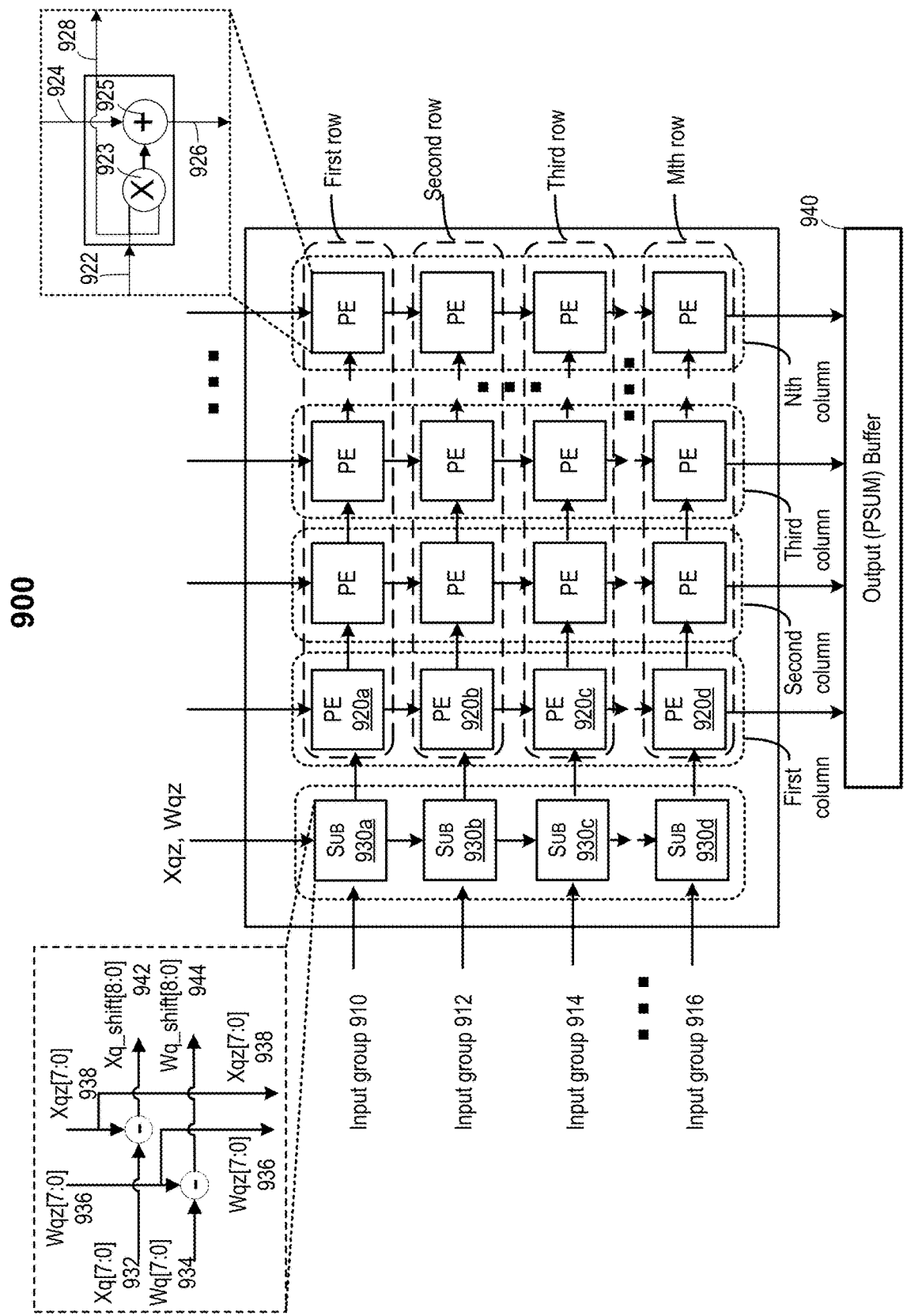
FIG. 9 illustrates a simplified example computing engine for performing an example convolution operation according to certain embodiments.

FIG. 9 illustrates a simplified example computing engine 900 for performing an example convolution operation (e.g., convolution operation 800) according to certain embodiments. Computing engine 900 may be a specific implementation of computing engine 524 and may be similar to computing engine 600 with some modifications. Computing engine 900 may include an M×N array of PEs with N PEs in each of the M rows and M PEs in each of the N columns. Each row may also include a subtraction engine 930a, 930b, 930c, . . . , or 930d that takes quantized inputs (e.g., in UNIT8 format) and zero-point integers (e.g., in UNIT8 format) from a memory or a buffer. For example, the inputs to the subtraction engine may include an 8-bit weight $W_q$ 934, an 8-bit input data element $X_q$ 932 (e.g., a pixel of an image or a feature map), an 8-bit zero-point integer $W_{qz}$ 936 for the weights, and an 8-bit zero-point integer $X_{qz}$ 938 for the input data elements. Zero-point integer $W_{qz}$ 936 and zero-point integer $X_{qz}$ 938 may be determined based on the range of the weights and the range of the input data elements, respectively, as described above with respect to, for example, equations (12) and (13). In some implementations, $X_{qz}$ 938 and $W_{qz}$ 936 may be programmable by software. The subtraction engine may subtract zero-point integer $W_{qz}$ 936 from weight $W_q$ 934 to generate a shifted weight $W_{q\_shift}$ 944 (e.g., a difference value) in INT9 format within the range of [−255, 255], and subtract zero-point integer $X_{qz}$ 938 from input data element $X_q$ 932 to generate a shifted input data element $X_{q\_shift}$ 942 in INT9 format. The subtraction engine may pass the shifted weight $W_{q\_shift}$ 944 in INT9 format and the shifted input data element $X_{q\_shift}$ 942 in INT9 format to a first PE 920a, 920b, 920c, . . . , or 920d in each row. The subtraction engine may also pass $W_{qz}$ 936 and $X_{qz}$ 938 to the subtraction engine on the next row.

Each PE may include a row input bus 922, a column input bus 924, a column output bus 926, and a row output bus 928. A PE may receive inputs from a preceding PE (on the left) in the same row (or from a subtraction engine) via row input bus 922. The inputs may be integers, such as 8-bit integers. The PE may also receive inputs from a preceding PE (on top) in the same column (or from external circuitry) via column input bus 924. The inputs may be integers that each include 8 or more bits. The PE may perform integer arithmetic operations (e.g., multiply and accumulate (MAC)) based on the inputs (e.g., 9-bit signed integers), and transmit the result of the arithmetic operations to a subsequent (lower) PE in the same column (or to external circuitry such as a buffer) via column output bus 926. The PE may also forward the inputs to a subsequent PE (to the right) in the same row, via row output bus 928.

Each row of computing engine 900 may process one input data set comprising multiple input data elements, whereas each column of computing engine 900 may generate a weighted sum of input data elements from different input data sets. For example, when computing engine 900 is to process M input pixel groups 910, 912, 914, . . . , and 916, a first row may receive input data elements of pixel group 910, a second row may receive input data elements of input pixel group 912, a third row may receive input data elements of input pixel group 914, . . . , and an Mth row may receive input data elements of input group 916. Each PE may include a multiplier 923 that would handle an input data element (e.g., an input pixel in 9-bit signed integer format) and a weight (e.g., in INT9 format) at a time. For example, a PE may receive an input data element and a weight (e.g., from row input bus 922) and generate, using multiplier 923, a multiplication product to represent a weighted input data element. The weight may be an element of a convolution kernel (i.e., filter) or a weight of a connection between nodes on two layers of a fully-connected layer. In addition, the PE may also receive a partial weighted sum from the preceding PE in the same column (e.g., from column input bus 924). The partial weighted sum represents the weighted sum of input data elements of input data sets received by PEs on rows above the PE. The PE may include an adder 925 that may add the weighted input data element to the partial weighted sum, and pass the updated partial weighted sum to the PE below (e.g., through column output bus 926). The PEs at the bottom row (e.g., PE 920d) may generate a weighted sum of input data elements received by all PEs on the same column.

The operations of each PE of computing engine 900 may be synchronized to a clock signal to improve the interoperability between computing engine 900 and other components of the neural network processor (e.g., neural network processor 902). Each PE may also include sequential logic circuitries (e.g., registers, latches, state machines, etc.) to store input data, weights, and output data for the adder and multiplier circuitry, and to synchronize the flow of the data into and out of the circuitry. The sequential logic circuitry of each PE can be clocked by either the same clock signal or a replica of the clock signal, such that data may be shifted into and/or out of the PE sequentially during the clock cycles. For example, in a first clock cycle, a PE 920b of the second row may receive a first input data element of pixel group 912 as well as a partial sum comprising a weighted first input data element of pixel group 910 from PE 920a of the first row. Within the first clock cycle, a PE 920b may multiply the input data element with a weight, add the multiplication product to the partial sum to generate an updated partial sum, and store the updated partial sum in an internal register. In the second clock cycle, PE 920b may forward the updated partial sum to a PE 920c on the third row below, which may perform the multiplication and accumulation to generate an updated partial sum. In the third clock cycle, PE 920c may forward the updated partial sum to a next PE on the fourth row below, which may perform the multiplication and accumulation to generate an updated partial sum. The updated partial sum may be propagated down along each column until it is output by PE 920d on the Mth row at the Mth clock cycle to an output buffer 940.

In some implementations, the partial sums from output buffer 940 may be scaled by an activation engine (e.g., activation engine 528a) or a pooling engine (e.g., pooling engine 528b) using a scaling factor, such as $S_X S_W$, to convert to more precise real values in floating point format for use by a subsequent layer.

Several benefits may be achieved by performing the matrix multiplication in the factored form as shown in equation (16) and using subtraction engines in front of the PE array to shift the unsigned integer inputs to generate difference values. For example, the input data (e.g., weights and pixel values in images or feature maps) may be stored in the memory in UINT8 format, which may allow easier hardware design and efficient storage and management than data in the INT9 format. The software may handle data in 8-bit format and may be unaware of the 9-bit arithmetic operations, which may allow for easier software design than addressing memory that holds data in 9-bit format. A real value 0 that is quantized asymmetrically to a non-zero unsigned integer (i.e., zero-point integer) with no quantization error may be converted to a signed integer value 0 by the subtraction engine before the multiplication, which may simplify the subsequent multiplication. Each matrix multiplication and de-quantization may be performed in a single pass using a PE array.

Performing 9-bit arithmetic operations may have minimum impact on the hardware in terms of the silicon area and operating frequency compared with arithmetic operations using 8-bit unsigned integers. For example, if the silicon area (or price) for computing a UINT8 multiplication and summation is A, the silicon area (or price) for computing a UINT16 multiplication and summation may be about 4A, the silicon area (or price) for computing a UINT32 multiplication and summation may be about 16A, while the silicon area (or price) for computing a FP32 multiplication and summation may be about 20A. Arithmetic operations using INT9 operands may be achievable with minimum extra hardware (e.g., about 1.05A) compared with arithmetic operations using UINT8 operands. Thus, compared with the matrix multiplication using FP32 operands, matrix multiplication using the techniques disclosed herein can reduce the cost of computation by a factor of about 19 (i.e., 20A/1.05A).

Figure 10:
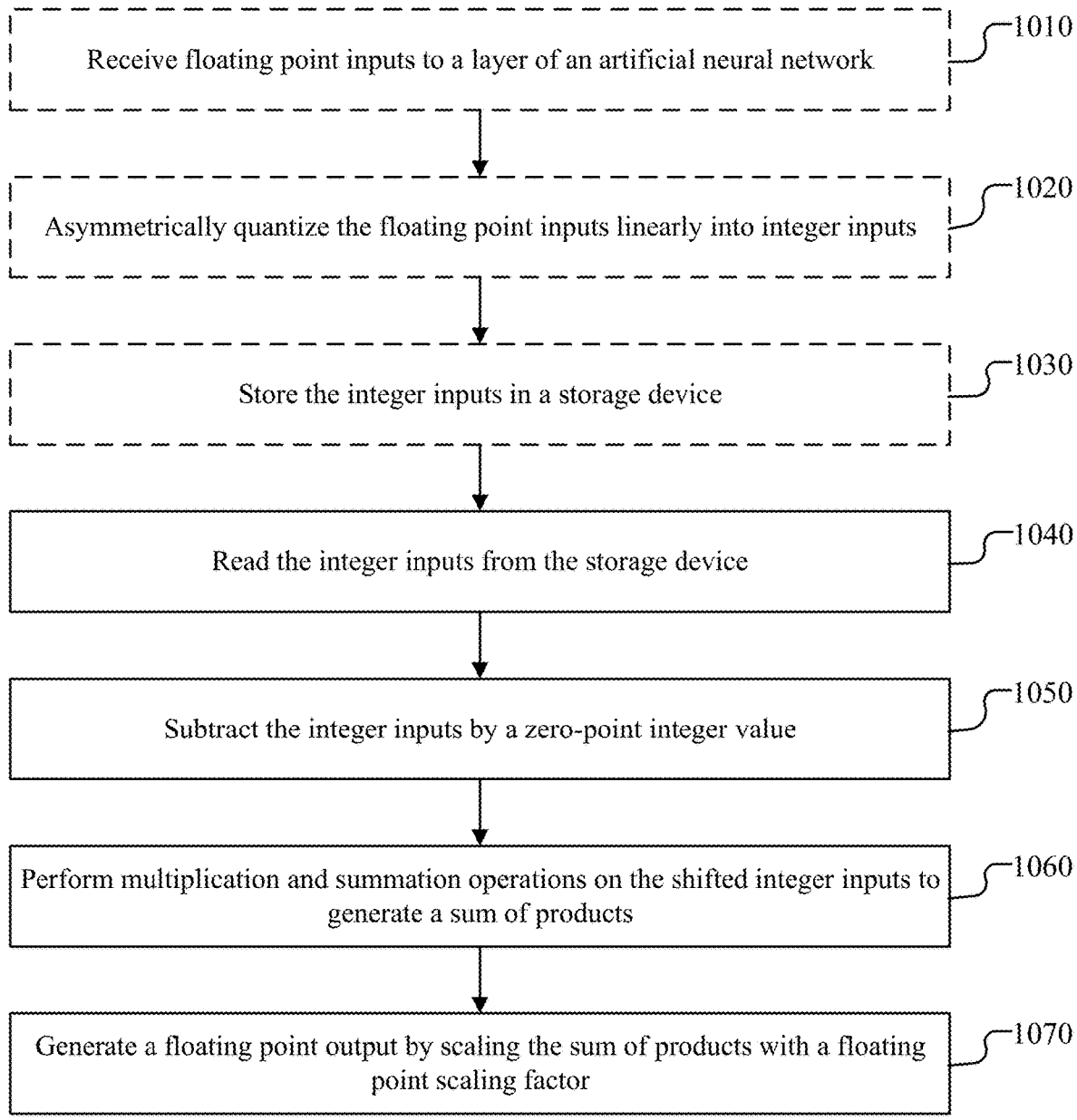
FIG. 10 is a simplified flow chart illustrating an example method of accelerating computation in an artificial neural network according to certain embodiments.

FIG. 10 is a simplified flow chart 1000 illustrating an example method of accelerating computation in an artificial neural network according to certain embodiments. The example method may be implemented using systems described above, such as, for example, a GPU, a TPU, a field-programmable gate array (FPGA), a system-on-chip (SoC), an application specific integrated circuit (ASIC), a programmable array logic (PAL), a complex programmable logic device (CPLD), neural network processor 502, computing engine 524 or 900, or a general purpose computer with instruction code. The instruction code may be stored on a non-transitory storage medium (e.g., on a memory device). The method presented in FIG. 10 and described below is intended to be illustrative and non-limiting.

Optionally, at block 1010, floating point inputs to a layer (e.g., a convolution layer) of an artificial neural network may be received. The floating point inputs may include weights and/or input data elements for the layer of the artificial neural network. For example, the weights may be weights of a pre-trained neural network. The input data elements may include, for example, an image to be analyzed by the neural network or a feature map generated by a preceding layer in the neural network. The floating point inputs may be in, for example, 32-bit floating point format.

Optionally, at block 1020, the floating point inputs may be linearly quantized into n-bit integer inputs, where n may be a power of 2 or a multiple of 8, such as 8 or 16. The quantization may be asymmetrical, where a minimum value of the floating point inputs may be quantized as integer zero, a maximum value of the floating point inputs may be quantized as $2^n-1$, and a zero value of the floating point inputs may be quantized as a zero-point integer value without any quantization error. In some embodiments, the quantization may be based on a scaling factor and a bias (e.g., the zero-point integer) using, for example, equation (12) or (13). For example, if n=8 and the inputs (e.g., the weights) are within a range of −0.5 to 3.5, the minimum value (floating point number −0.5) of the inputs may be quantized as integer 0, the maximum value (floating point number 3.5) of the inputs may be quantized as integer 255, and the floating point value 0 may be quantized as integer 32

(i.e., the zero-point integer). Thus, if the range of the floating point inputs is not symmetrical with respect to floating point zero, the range of the quantized integer inputs may not be symmetrical with respect to the zero-point integer. The weights for the layer and the input data elements may have different ranges and thus may be quantized independently based on their corresponding ranges. Therefore, the zero-point integer for the weights may be different from the zero-point integer for the input data elements, and the scaling factor for the weights may be different from the scaling factor for the input data elements.

Optionally, at block 1030, the integer inputs may be stored in a storage device, such as a buffer or a volatile or non-volatile memory device. Because the floating point inputs (e.g., 32-bit or 4-byte floating point values) are quantized as, for example, 8-bit unsigned integers, the size of the storage space for storing the integer inputs may be reduced significantly. As described above, because the number of bits in each integer input is a power of 2 or a multiple of 8, such as 8 or 16, the integer inputs may be more efficiently stored in the storage device and may be more easily managed by software.

At block 1040, the convolution layer may read the integer inputs from the storage device. Because the integer inputs have a much smaller data size compared with the floating point inputs, the amount of data to be read from the storage device and the bandwidth used to transfer the data may be significantly reduced.

At block 1050, the integer inputs may be shifted by the zero-point integer such that the zero value of the floating point inputs, which is quantized to the zero-point integer, is now represented by integer zero. The shifting may be performed by, for example, an array of subtraction engines configured to subtract the zero-point integer from the integer inputs to generate difference values as described with respect to FIG. 9. After the shifting, the integer inputs may be converted to signed integers with one more bit. For example, if the integer inputs are 8-bit unsigned integers, the shifted integer inputs may be 9-bit signed integers. For example, in the example described with respect to block 1020, after the shifting, floating point number −0.5 that is quantized as integer 0 may be represented by signed integer −32, floating point number 3.0 that is quantized as integer 255 may be represented by signed integer 223, and the floating point value 0 that is quantized as integer 32 (i.e., the zero-point integer value) may now be represented by signed integer 0.

At block 1060, multiplication and summation operations may be performed on the shifted integer inputs to generate a sum of products. As described above with respect to FIG. 9, in some implementations, the multiplication and summation operations may be performed by a PE array that includes a plurality of rows, where each row of PEs may receive the shifted integer inputs from a corresponding subtraction engine. Each PE may be configured to perform an integer multiplication and summation, where the products of the multiplications from the PEs in a same column may be summed to generate the sum of products.

At block 1070, the sum of products may be scaled by a floating point scaling factor to generate a floating point output that may be used by a subsequent layer for further processing. For example, the floating point output may be part of a feature map that may be further processed by an activation layer or another convolution layer. In some embodiments, the scaling may be performed at, for example, an activation layer, a pooling layer, or any other processing module of the artificial neural network than can perform a floating point multiplication. The floating point scaling factor may be a product of the scaling factor for the weights and the scaling factor for the input data elements as shown in equation (20).

Even though FIG. 10 describes the example methods as sequential operations, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

In some implementations, techniques disclosed above can also be used to perform convolution operation or matrix multiplication in systems other than artificial neural network. For example, the technique disclosed herein can be used for convolution operations in image processing without using a neural network.

In some implementations, techniques disclosed above can be used to reduce the storage space, transportation bandwidth, and computing power used to perform convolution operations or other matrix multiplications for data in high-precision format, such as 16-bit, 32-bit, 64-bit, or more floating point or decimal point data, or 16-bit, 32-bit, 64-bit or more integer data. In some implementations, the data in high-precision data can be quantized to a low-precision data, such as, for example, 16-bit floating point data or 16-bit or 8-bit integer data. The high-precision data and low-precision data may represent data in the same range but in different precisions or resolutions. For example, when 16-bit data is used to represent values between 0.0 to 1.0, the precision or resolution may be $2^{-16}$, while the precision or resolution of 8-bit data that represents values between 0.0 to 1 is $2^{-8}$. As discussed above, in neural network, high-precision data may be used for training, while low-precision data may be sufficient for at least some operations during inference. In various implementations, the number of bit in each element of the low-precision data may be a multiple of 8 (e.g., byte-aligned) such that the low-precision data can be more efficiently stored in a storage device and managed by a controller or software.

Figure 11:
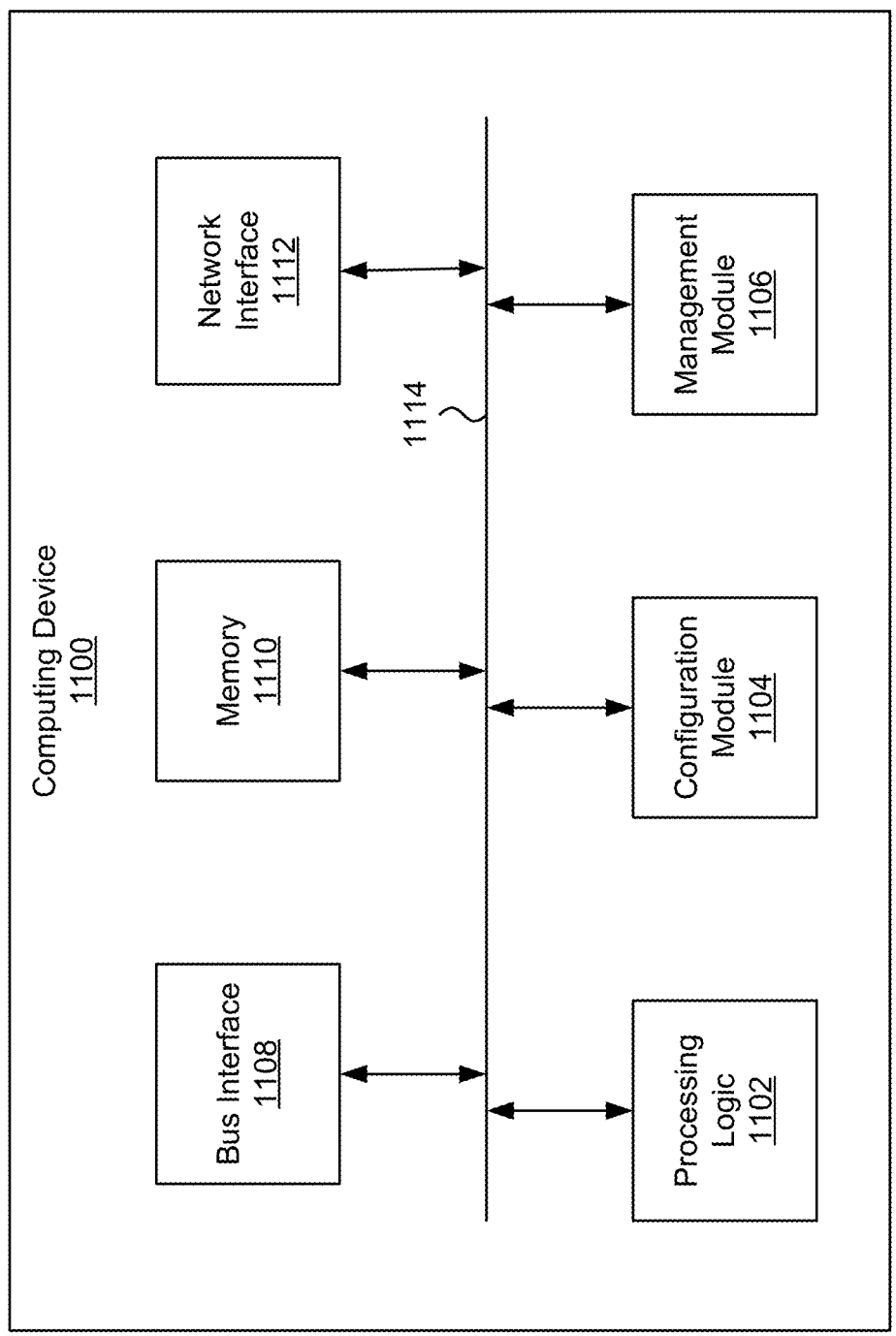
FIG. 11 illustrates an example computing device according to certain embodiments.

FIG. 11 illustrates an example of a computing device 1100. Functionality and/or several components of the computing device 1100 may be used without limitation with other embodiments disclosed elsewhere in this disclosure, without limitations. A computing device 1100 may perform computations to facilitate processing of a task. As an illustrative example, computing device 1100 can be part of a server in a multi-tenant compute service system. Various hardware and software resources of computing device 1100 (e.g., the hardware and software resources associated with provision of an image recognition service) can be allocated to a client upon request.

In one example, the computing device 1100 may include processing logic 1102, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The computing device 1100 may include additional modules, not illustrated here. In some implementations, the computing device 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110. Processing logic 1102 may also include hardware circuities for performing artificial neural network computation including, for example, Neural network processor 302, etc.

The access to processing logic 1102 can be granted to a client to provide the personal assistant service requested by the client. For example, computing device 1100 may host a virtual machine, on which an image recognition software application can be executed. The image recognition software application, upon execution, may access processing logic 1102 to predict, for example, an object included in an image. As another example, access to processing logic 1102 can also be granted as part of bare-metal instance, in which an image recognition software application executing on a client device (e.g., a remote computer, a smart phone, etc.) can directly access processing logic 1102 to perform the recognition of an image.

The memory 1110 may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the computing device 1100, while in other cases some or all of the memory may be external to the computing device 1100. The memory 1110 may store an operating system comprising executable instructions that, when executed by the processing logic 1102, provides the execution environment for executing instructions providing networking functionality for the computing device 1100. The memory 1110 may also store, for example, software applications for performing artificial neural network computation. For example, memory 1110 may store software routines related to the computations of equations above. In a case where processing logic 1102 is in the form of FPGA, memory 1110 may store netlists data representing various logic circuit components of processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the computing device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1100 may include multiple network interface modules, each configured to communicate with a different network. For example, in these implementations, the computing device 1100 may include a network interface module for communicating with a wired Ethernet network, a wireless 802.11 network, a cellular network, an Infiniband network, etc. In some embodiments, computing device 1100 may receive a set of parameters, such as the aforementioned weight vectors for generation of forget gate factor, input factor, output factor, etc. from a server through network interface module 1112.

The various components and modules of the computing device 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus comprising:
a first circuit configured to:
receive first values in a first format, the first values being generated from one or more asymmetric quantization operations of second values in a second format, and
generate difference values based on subtracting a third value from each of the first values, the third value representing a zero value in the first format;
a second circuit configured to generate a sum of products in the first format using the difference values; and
a third circuit configured to convert the sum of products from the first format to the second format based on scaling the sum of products with a scaling factor.

2. The apparatus of claim 1, wherein, in the one or more asymmetric quantization operations:
a minimum value of the second values in the second format is quantized as a zero value in the first format;
a maximum value of the second values in the second format is quantized as a maximum value in the first format; and
a zero value in the second format is quantized as the third value in the first format with no quantization error.

3. The apparatus of claim 1, wherein the first values comprise weights and input data elements for a layer of an artificial neural network, each weight corresponding to an input data elements;
wherein the second circuit is configured to:
for each weight and the corresponding input data element, perform a multiple operation between a first difference value representing the weight and a second difference value representing the input data element to generate a product; and
perform summation operations of the products to generate the sum of products.

4. The apparatus of claim 3, wherein the second circuit comprise an array of processing elements, a first processing element of the array of processing elements being configured to, in one pass:
perform a first multiplication operation between a first weight and a first input data element to generate a first product;
receive a first partial sum of products from a first adjacent processing element;
perform a first summation operation between the first product and the first partial sum of products to generate a second partial sum of products; and
forward the second partial sum of products to a second adjacent processing element to generate the sum of products.

5. The apparatus of claim 4, wherein the sum of products is generated by a subset of the array of processing elements arranged along a first dimension in a single pass.

6. The apparatus of claim 3, wherein the scaling factor comprises a product of a first scaling factor and a second scaling factor;
   wherein the first scaling factor is associated with a first asymmetric operation of the weights; and
   wherein the second scaling factor is associated with a second asymmetric operation of the input data elements.

7. The apparatus of claim 3, wherein the third circuit comprises a post-processing circuit configured to operate on the sum of products in the second format;
   wherein the post-processing circuit comprises at least one of: an activation engine, a pooling engine, or an output buffer of an artificial neural network.

8. The apparatus of claim 7, wherein:
   the first circuit comprise an array of subtraction engines;
   the second circuit comprises an array of processing elements; and
   the first circuit, the second circuit, and the third circuit are part of a neural network hardware accelerator.

9. The apparatus of claim 8, wherein the array of processing elements of the second circuit is configured to generate the sum of products in the first format as part of a convolution operation.

10. The apparatus of claim 8, wherein the apparatus comprises a field-programmable gate array (FPGA), a system-on-chip (SoC), an application specific integrated circuit (ASIC), a programmable array logic (PAL), or a complex programmable logic device (CPLD).

11. The apparatus of claim 1, wherein the first format has a lower precision than the second format.

12. The apparatus of claim 11, wherein the first format comprises an integer format; and
   wherein the second format comprises a floating point format.

13. The apparatus of claim 12, wherein the first values are in an 8-bit unsigned integer format;
   wherein the difference values are in a 9-bit signed integer format; and
   wherein the second values are in a 32-bit floating point format.

14. A method comprising:
   receiving, by a first circuit, first values in a first format, the first values being generated from one or more asymmetric quantization operations of second values in a second format;
   generating, by the first circuit, difference values based on subtracting a third value from each of the first values, the third value representing a zero value in the first format;
   generating, by a second circuit, a sum of products in the first format using the difference values; and
   converting, by a third circuit, the sum of products from the first format to the second format based on scaling the sum of products with a scaling factor.

15. The method of claim 14, wherein, in the one or more asymmetric quantization operations:
   a minimum value of the second values in the second format is quantized as a zero value in the first format;
   a maximum value of the second values in the second format is quantized as a maximum value in the first format; and
   a zero value in the second format is quantized as the third value in the first format with no quantization error.

16. The method of claim 14, wherein the first values comprise weights and input data elements for a layer of an artificial neural network, each weight corresponding to an input data elements;
   wherein the method further comprises:
      for each weight and the corresponding input data element, performing, by the second circuit, a multiple operation between a first difference value representing the weight and a second difference value representing the input data element to generate a product; and
      performing summation operations of the products to generate the sum of products.

17. The method of claim 16, wherein the second circuit comprise an array of processing elements; and
   wherein the method further comprises, in one pass:
      performing, by a first processing element of the array of processing elements, a first multiplication operation between a first weight and a first input data element to generate a first product;
      receiving, by the first processing element, a first partial sum of the products from a first adjacent processing element;
      performing, by the first processing element, a first summation operation between the first product and the first partial sum of the products to generate a second partial sum of products; and
      forwarding, by the first processing element, the second partial sum of products to a second adjacent processing element to generate the sum of products.

18. The method of claim 17, wherein the sum of products is generated by a subset of the array of processing elements arranged along a first dimension in a single pass.

19. The method of claim 16, wherein the scaling factor comprises a product of a first scaling factor and a second scaling factor;
   wherein the first scaling factor is associated with a first asymmetric operation of the weights; and
   wherein the second scaling factor is associated with a second asymmetric operation of the input data elements.

20. The method of claim 14, wherein:
   the first circuit comprise an array of subtraction engines;
   the second circuit comprises an array of processing elements; and
   the first circuit, the second circuit, and third circuit are part of a neural network hardware accelerator.

* * * * *